US012595993B2

(12) United States Patent
Kotsonis et al.

(10) Patent No.: US 12,595,993 B2
(45) Date of Patent: Apr. 7, 2026

(54) SAFETY SYSTEMS FOR COMMERCIAL BLASTING OPERATIONS

(71) Applicant: Orica International Pte Ltd, Singapore (SG)

(72) Inventors: Steven E. Kotsonis, Singapore (SG); Kaiyan Liu, Singapore (SG); Aung Thu, Singapore (SG); Walter Hardy Piel, Singapore (SG); Francois Guillemette, Singapore (SG); Daniel Mallette, Singapore (SG); David Martino, Singapore (SG)

(73) Assignee: Orica International Pte Ltd, Singapore (SG)

( * ) Notice: Subject to any disclaimer, the term of this patent is extended or adjusted under 35 U.S.C. 154(b) by 0 days.

(21) Appl. No.: 18/685,349

(22) PCT Filed: Aug. 23, 2022

(86) PCT No.: PCT/SG2022/050603
§ 371 (c)(1),
(2) Date: Feb. 21, 2024

(87) PCT Pub. No.: WO2023/027639
PCT Pub. Date: Mar. 2, 2023

(65) Prior Publication Data
US 2024/0361115 A1 Oct. 31, 2024

(30) Foreign Application Priority Data

Aug. 24, 2021 (AU) ................................ 2021221550
Sep. 9, 2021 (SG) ........................... 10202109895X

(51) Int. Cl.
*F42D 1/055* (2006.01)
*F42D 5/00* (2006.01)
(Continued)

(52) U.S. Cl.
CPC ............... *F42D 1/055* (2013.01); *F42D 5/00* (2013.01); *G06K 7/10366* (2013.01);
(Continued)

(58) Field of Classification Search
CPC ....................................................... F42D 1/055
See application file for complete search history.

(56) References Cited

U.S. PATENT DOCUMENTS

| 8,508,349 B2 * | 8/2013 | Morgan | ................ B60R 25/102 340/5.72 |
| 2005/0030188 A1 * | 2/2005 | Flanagan | ................ B60R 99/00 340/457 |

(Continued)

FOREIGN PATENT DOCUMENTS

| CN | 112196621 A | 1/2021 |
| CN | 112504042 A | 3/2021 |
| WO | 2021222946 A1 | 11/2021 |

OTHER PUBLICATIONS

International Search Report and Written Opinion, issued by the Australian Patent Office, as International Searching Authority for PCT/SG2022/050603 on Feb. 2, 2023, 16 pages.

(Continued)

*Primary Examiner* — Davetta W Goins
*Assistant Examiner* — Pameshanand Mahase
(74) *Attorney, Agent, or Firm* — Kilpatrick Townsend & Stockton LLP

(57) ABSTRACT

The safety systems for commercial blasting operations include wireless transmitter system(s) configured to send command signals wirelessly to wireless devices that are configured for wireless electronic blasting (web). The system also includes disable antenna(s) that define deactivation zone(s): vehicle/personnel presence detector system(s) including detectors that define detection zone(s), and/or RFID scanner system(s) with reader antennas that defined
(Continued)

scanner zone(s); and a safety control system in electronic communication with the wireless transmitter system(s), and the vehicle/personnel presence detector systems and/or the RFID scanner systems, wherein the safety control system is configured to control the wireless transmitter systems to send wireless disable command(s) to disable the wireless devices that are within the deactivation zones, and/or to control alarm system(s) to generate alarms, in response to a vehicle/person being detected in the detection zones and/or a wireless device being detected in the scanner zones.

20 Claims, 9 Drawing Sheets

(51) Int. Cl.

| | | |
|---|---|---|
| *G06K 7/10* | (2006.01) | |
| *G08B 21/02* | (2006.01) | |
| *G08B 21/22* | (2006.01) | |
| *G08B 25/10* | (2006.01) | |

(52) U.S. Cl.
CPC ............. *G08B 21/02* (2013.01); *G08B 21/22* (2013.01); *G08B 25/10* (2013.01)

(56) References Cited

U.S. PATENT DOCUMENTS

| | | | |
|---|---|---|---|
| 2007/0119326 A1 | 5/2007 | Rudakevych et al. | |
| 2007/0185728 A1* | 8/2007 | Schwarz | G06Q 30/0283 |
| | | | 701/36 |
| 2011/0183601 A1* | 7/2011 | Hannon | H04W 48/04 |
| | | | 455/67.11 |
| 2014/0053750 A1* | 2/2014 | Lownds | F42D 1/05 |
| | | | 361/248 |
| 2014/0311370 A1 | 10/2014 | Koekemoer et al. | |
| 2017/0016703 A1 | 1/2017 | Mace et al. | |
| 2017/0074630 A1 | 3/2017 | Kotsonis et al. | |
| 2019/0080565 A1* | 3/2019 | Lee | G08B 25/10 |
| 2020/0084314 A1* | 3/2020 | Mahar | H04W 4/40 |

OTHER PUBLICATIONS

Application No. EP22861809.6, Extended European Search Report, Mailed on Jun. 13, 2025, 13 pages.
"Office Action" with machine translation, Sep. 2, 2025, 46 pages.

* cited by examiner

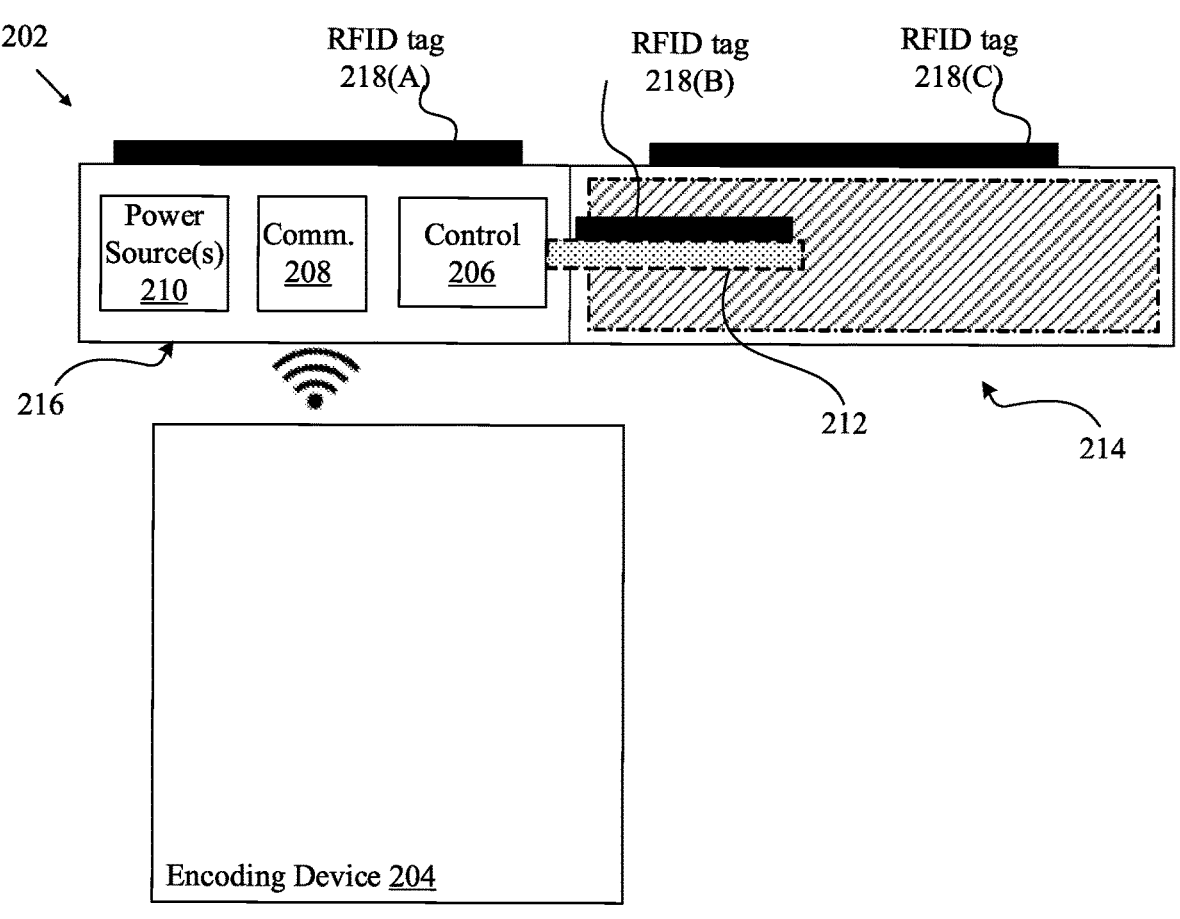
FIG. 2
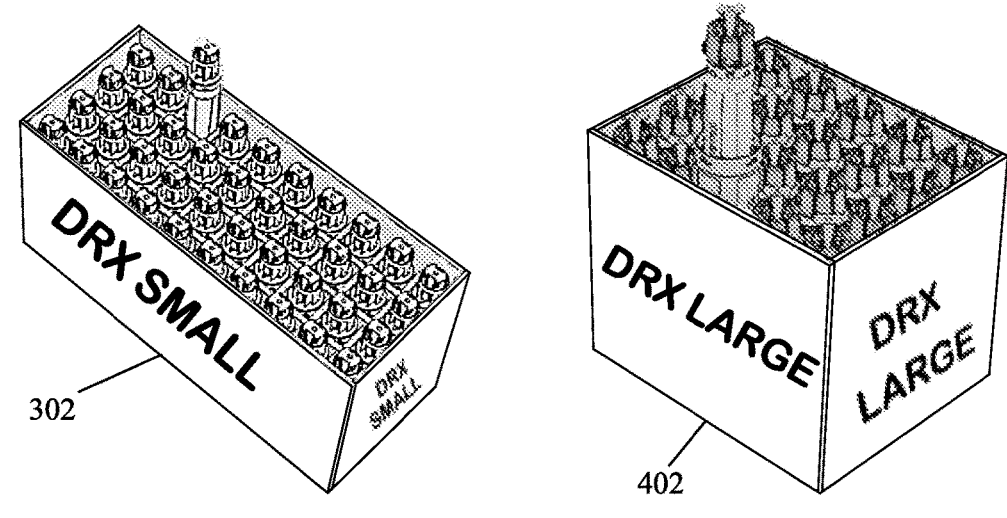
FIG. 3        FIG. 4

700
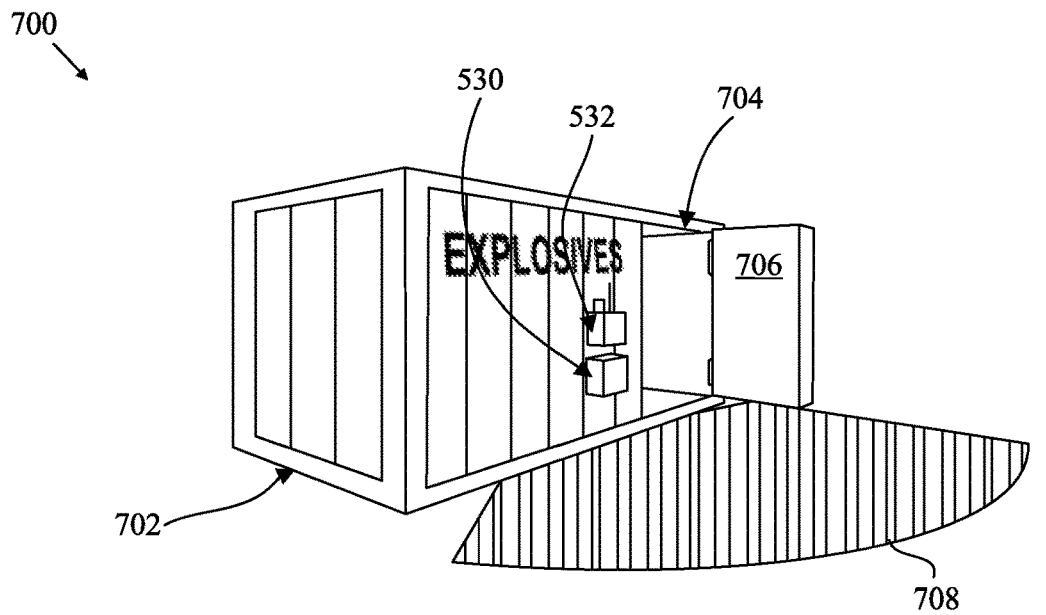
FIG. 7
800
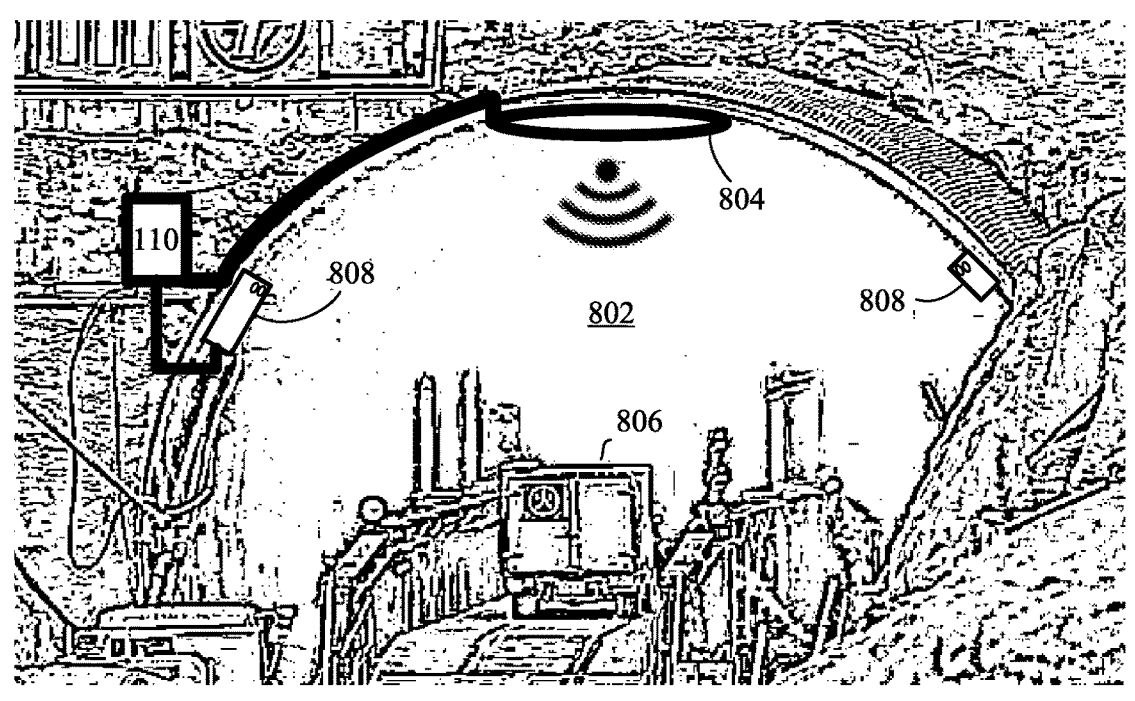
FIG. 8

1100

1000

204

510

SAFETY SYSTEMS FOR COMMERCIAL BLASTING OPERATIONS

CROSS REFERENCE TO RELATED APPLICATIONS

The present application is a U.S. National Stage of International Application No. PCT/SG2022/050603, filed on Aug. 23, 2022, which claims priority to Australian Application No. 2021221550, filed on Aug. 24, 2021, and to Singaporean Patent Application No. 10202109895X, filed on Sep. 9, 2021, all of which are incorporated by reference herein in their entireties.

TECHNICAL FIELD

Aspects of the present disclosure relate to automatic systems and processes or methods for improving the safety of commercial blasting operations based on wireless electronic blasting (WEB) devices that are deployable within portions of physical media (e.g., a rock formation) intended to be blasted as part of a commercial blasting operation.

BACKGROUND

A key benefit of wireless blasting systems, such as the Orica™ Webgen™ system (Orica International Pte Ltd, Singapore) in which Webgen™ wireless initiation devices are used to carry out commercial blasting operations is that, unlike wire-based blasting systems, the wireless initiation devices are not tethered by a physical lead wire to a remote blast-box, from which they receive the command and/or required energy to FIRE. Rather, a Webgen™ initiation device receives its signal to FIRE via a wireless signal transmitted using low-frequency signal transmission, which is not blocked by the earth and travels over extended distances, with a practical range in the 100 m to 1 km range. Consequently, at deployment, a Webgen™ primer carries on-board the energy required to FIRE, which is managed by specifically designed electronics to ensure that it will FIRE, when, and only when, it receives an appropriate FIRE command. This lack of physical lead wires significantly reduces the misfire rate and allows innovative blast designs not previously possible. Removal of lead wires, however, means that in theory, any properly encoded initiation device(s) can be initiated if in wireless signal reception range, regardless of whether or not the initiation device(s) reside(s) in the blasthole(s).

Central to the safety of commercial blasting operations is withholding the energy to explosively initiate blasting compositions until humans are not in the line-of-fire. This practice pre-dates the invention of the safety fuse in 1831 and the invention of the electric detonator in 1910, whereby a match or dynamo/battery, respectively, were not applied to the lead-line until all people evacuated.

Administrative and 'soft' procedural/engineering controls can aid wireless blasting safety, which are effective but not ideal. A need exists for stricter or hard/engineering controls to enhance or maximize the likelihood that the correct primer will operate only at or in its intended location. Such hard/engineering controls should be robust and reliable (e.g., highly reliable) under a wide or full range of commercial blasting operating environments, conditions, and situations.

It is desired to address or ameliorate one or more disadvantages or limitations associated with the prior art, or to at least provide a useful alternative.

SUMMARY

Disclosed herein is a system for commercial blasting operations, the system including:

a) one or more wireless transmitter systems 102 configured to send command signals wirelessly to wireless devices (which may include tagged wireless devices 202) that are configured for wireless electronic blasting (WEB), the wireless transmitter systems including one or more disable antennas that define one or more deactivation zones;

b) one or more vehicle/personnel presence detector systems 104 including detectors that define one or more detection zones, and/or one or more RFID scanner systems 106 with reader antennas that defined one or more scanner zones; and c) a safety control system 110 in electronic communication with the one or more wireless transmitter systems 102, and the vehicle/personnel presence detector systems 104 and/or the RFID scanner systems 106, d) wherein the safety control system 110 is configured to control the wireless transmitter systems 102 to send at least one wireless DISABLE command to disable the wireless devices that are within the deactivation zones, and/or to control one or more alarm systems 108 to generate alarms, in response to a vehicle/person being detected in the detection zones and/or a wireless device being detected in the scanner zones.

The disable antennas may include: one or more RF antennas 514 and/or one or more MI antennas 518.

The DISABLE command may act as a state transition signal or command by which a set of the wireless initiation device can be or is transitioned to a safe/standby mode or a reset/disabled state, including after the set of the wireless initiation device has been programmed/encoded.

The system may include the one or more alarm systems 108, wherein the safety control system 110 is in electronic communication with the one or more alarm systems 108, wherein the safety control system 110 is configured to control the alarm systems 108 to generate the alarms when the safety control system 110 detects the wireless devices within scanner zones that are defined by locations/orientations of reader antennas of the RFID scanner systems 106.

The alarm systems 108 may be configured to sound, display and or send alarms, including at a plurality of urgency levels, when they receive an alarm command with an urgency level from the safety control system 110.

The DISABLE command may include a wireless device ID and/or a wireless device GID in order to selectively disable only wireless devices in the deactivation zone with a matching ID or GID.

The wireless devices may include respective RFID tags mounted/attached thereto, optionally passive RFID tags.

The RFID scanner systems 106 may provide continuous (e.g., near-continuous/rapidly recurrent) background reading of the RFID tags The RFID scanner systems 106 may include a plurality of RFID scanner systems 106 with substantially overlapping scanner zones.

The safety control system 110 may be in electronic communication with a central blasting computing systems, and is configured to request a status of associated of the wireless device, from the central blasting computing systems, based on an ID scanned by the RFID scanner systems 106.

The system may include a WEB system with a blast controller 510 and one or more signal generators connected to the blast controller 510 to receive signals representing wireless electronic blasting commands, optionally including an RF signal generator 512 configured to drive an RF antenna 514 mounted and configured to direct the RF signals toward or to the wireless devices in boreholes 506, and optionally including an MI signal generator 516 configured to drive an MI antenna 518 mounted and configured to direct the MI signals toward or to the wireless devices in the boreholes 506, optionally wherein the safety control system 110 connects/couples communicatively to the RF signal generator 512 and/or the MI signal generator 516 to transmit the DISABLE command to the wireless devices in the boreholes 506.

The system may include one or more access structures 508 that provide access for the vehicles/people through boundary structures 502 and into/from site storage structures 504, wherein the access structures 508 define respective access points for the vehicles/people, wherein:

a) the RF/MI antennas 522/526 are configured (with selected signal/beam distributions/patterns, and RF/MI power) and mounted (with at least partially overlapping signal/beam distributions/patterns) such that the deactivation zones overlap with the access points, b) the access detector systems 528 are mounted/positioned surrounding and/or adjacent the access structures 508 such that the detection zones overlap the access points, and/or c) the one or more scanner antennas 530 are mounted adjacent to and/or surrounding one or more of the access structures 508 to cover and/or cross the access point of the corresponding access structure 508 such that the scanner zones overlap the access points.

The one or more vehicle/personnel presence detector systems 104 may be configured to detect/determine respective travel directions of a vehicle/person through the one or more of the detection zones, and the at least one wireless DISABLE command may be selectively generated based on the determined travel direction of each detection zone.

Disclosed herein is a process or method for commercial blasting operations, the process or method including:

a) detecting a vehicle/personnel in a detection zone, and/or scanning an RFID tag of at least one wireless device (which may include a tagged wireless device 202) that is configured for wireless electronic blasting (WEB) in a scanner zone; and b) controlling one or more wireless transmitter systems 102 to send a wireless DISABLE command to disable wireless devices within one or more deactivation zones, and/or controlling one or more alarm systems 108 to generate alarms, in response to the vehicle/person being detected in the detection zone and/or the wireless device being detected in the scanner zone.

The process or method may include transmitting the wireless DISABLE command by way of one or more RF antennas 514 defining one of the deactivation zones using RF frequencies that travel substantially through the air (TTA) but not substantially TTE (for geological materials adjacent to the deactivation zone in which an array of boreholes 506 is arranged) when the array of at least one borehole 506 has been loaded with the at least one wireless device which is configured to respond to ARM and FIRE commands by way of through the earth (TTE) signals (which are typically magnetic induction (MI) signals).

Disclosed herein is a system for commercial blasting operations, the system including:

a) an alarm/disable system including:

i) one or more wireless transmitter systems 102 configured to send command signals wirelessly to wireless devices that are configured for wireless electronic blasting (WEB), the wireless transmitter systems including one or more disable antennas that define one or more deactivation zones, and/or ii) one or more alarm systems 108 configured to sound, display and/or send alarms, optionally including at a plurality of urgency levels, when they receive an alarm command optionally with an urgency level;

b) a scanner/detector system including:

i) one or more vehicle/personnel presence detector systems 104 including detectors that define one or more detection zones, and/or ii) one or more RFID scanner systems 106 with reader antennas that defined one or more scanner zones; and c) a safety control system 110 in electronic communication with the one or more wireless transmitter systems 102 and/or the one or more alarm systems 108, and with the vehicle/personnel presence detector systems 104 and/or the RFID scanner systems 106, wherein the safety control system 110 is configured to:

control the wireless transmitter systems 102 to send at least one wireless DISABLE command to disable the wireless devices that are within the deactivation zones when the safety control system 110 detects that a vehicle/person is detected in the detection zones and/or a wireless device is scanned in the scanner zones, optionally based on the urgency level; and/or control the alarm systems 108 to sound, display and/or send the alarms when the safety control system 110 detects that a vehicle/person is detected in the detection zones and/or a wireless device is scanned in the scanner zones, optionally based on the urgency level.

Disclosed herein is a process or method for commercial blasting operations, the method including:

a) detecting a vehicle/personnel in a detection zone, and/or scanning an RFID tag of a wireless device that is configured for wireless electronic blasting (WEB) in a scanner zone; and b) in response to the vehicle/person being detected in the detection zone and/or the wireless device being detected in the scanner zone, automatically controlling:

i) one or more wireless transmitter systems 102 to send a wireless DISABLE command to disable wireless devices within one or more deactivation zones, optionally including at a plurality of urgency levels; and/or ii) one or more alarm systems 108 to sound, display and/or send alarms, optionally including at a plurality of urgency levels.

Disclosed herein is a system for commercial blasting operations, the system including:

a) an encoder 204 configured to encode/program one or more wireless devices that are configured for wireless electronic blasting (WEB); and b) an encoder key, which must be present with the encoder 204 for the encoder 204 to program/encode the wireless devices, and/or a beacon 1402 defining a geofenced zone, which the encoder 204 must be within for the encoder 204 to program/encode the wireless devices.

Disclosed herein is a system for commercial blasting operations, the system including:

a) a blast controller 510 configured to send, relay, and/or verify blasting commands directed to one or more wireless devices that are configured for wireless electronic blasting (WEB); and b) a blast controller key, which must be present with the blast controller 510 for the blast controller 510 to send, relay, and/or verify the blasting commands directed to the wireless devices.

The system may include a combined key that includes both a/the encoder key and a/the blast controller key (optionally in a unit/device) such that a/the encoder 204 can only program/encode with the combined key, and a/the blast controller 510 can only send blast commands with the combined key.

Disclosed herein is a process or method for commercial blasting operations, the method including:

a) an encoder 204 automatically determining whether a beacon 1402 and/or an encoder key (a manually separable communications device with a unique key ID) is connected to or in range (e.g., wireless communication range) of the encoder 204; and b) if so, the encoder 204 programming/encoding one or more wireless devices that are configured for wireless electronic blasting (WEB).

Disclosed herein is a process or method for commercial blasting operations, the process or method including:

a) a blast controller 510 automatically determining whether a blast controller key (a manually separable communications device with a unique key ID) is connected to or in range (e.g., wireless communication range) of the blast controller 510; and b) if so, the encoder 204 programming/encoding one or more wireless devices that are configured for wireless electronic blasting (WEB).

The process or method may include using a combined key that includes both a/the encoder key and a/the blast controller key (optionally in a unit/device) such that a/the encoder 204 can only program/encode with the combined key, and a/the blast controller 510 can only send blast commands with the combined key.

BRIEF DESCRIPTION OF THE DRAWINGS

Some embodiments are hereinafter described, by way of non-limiting example only, with reference to the accompanying drawings, in which:

b) FIG. 2 is a schematic diagram of a WEB device ("wireless device") configured for the alarm/disable system;

c) FIG. 3 is a rendered image of a plurality of small embodiments of the wireless device;

d) FIG. 4 is a rendered image of a plurality of large embodiments of the wireless device;

g) FIG. 7 is a sketch of a container with the alarm/disable system;

h) FIG. 8 is a sketch of a gateway with the alarm/disable system;

DETAILED DESCRIPTION

Embodiments in accordance with the present disclosure are directed to systems, apparatuses, devices, methods, processes, and procedures for automatically enhancing the safety of commercial blasting operations, e.g., mining, civil tunnelling, construction demolition, or geophysical/seismic exploration operations. In particular, disclosed herein is a safety system and process or method for improving the safety of commercial/civil blasting operations at a work site, including a mine site, that use wireless electronic blasting (WEB), including one or more wireless devices. The safety system may be described as a "hard" safety system because it operates automatically, i.e., does not require trained persons to take certain actions to provide improved safety in the work site. The wireless devices are deployable or deployed proximate to or within a portion of physical media intended to be blasted as part of a commercial blasting operation. The wireless devices each include a device-based wireless receiver (e.g., a magnetic induction (MI) receiver) configured for through the earth (TTE) communication. The wireless device, which can be referred to as a "wireless electronic blasting (WEB) device", is a wireless-enabled device that contains an explosive/detonator/initiator, or a wireless-enabled device that is configured to be assembled with/to a device that contains an explosive/detonator/initiator, and that (at least when assembled) is configured to receive and operate responsively to wireless blasting commands, including ARM and FIRE commands, and is configured to fit in a borehole to effect blasting according to a blasting plan. Examples of such WEB wireless devices may include a wireless detonator, a wireless primer, and/or a wireless receiver component of a wireless initiator, e.g., including a magnetic induction (MI) receiver and/or a radio-frequency (RF) receiver, such as a WebGen™ disposable receiver ("DRX") that is coupled or couplable to a booster and in some instances a detonator.

Alarm/Disable System 100

Figure 1:
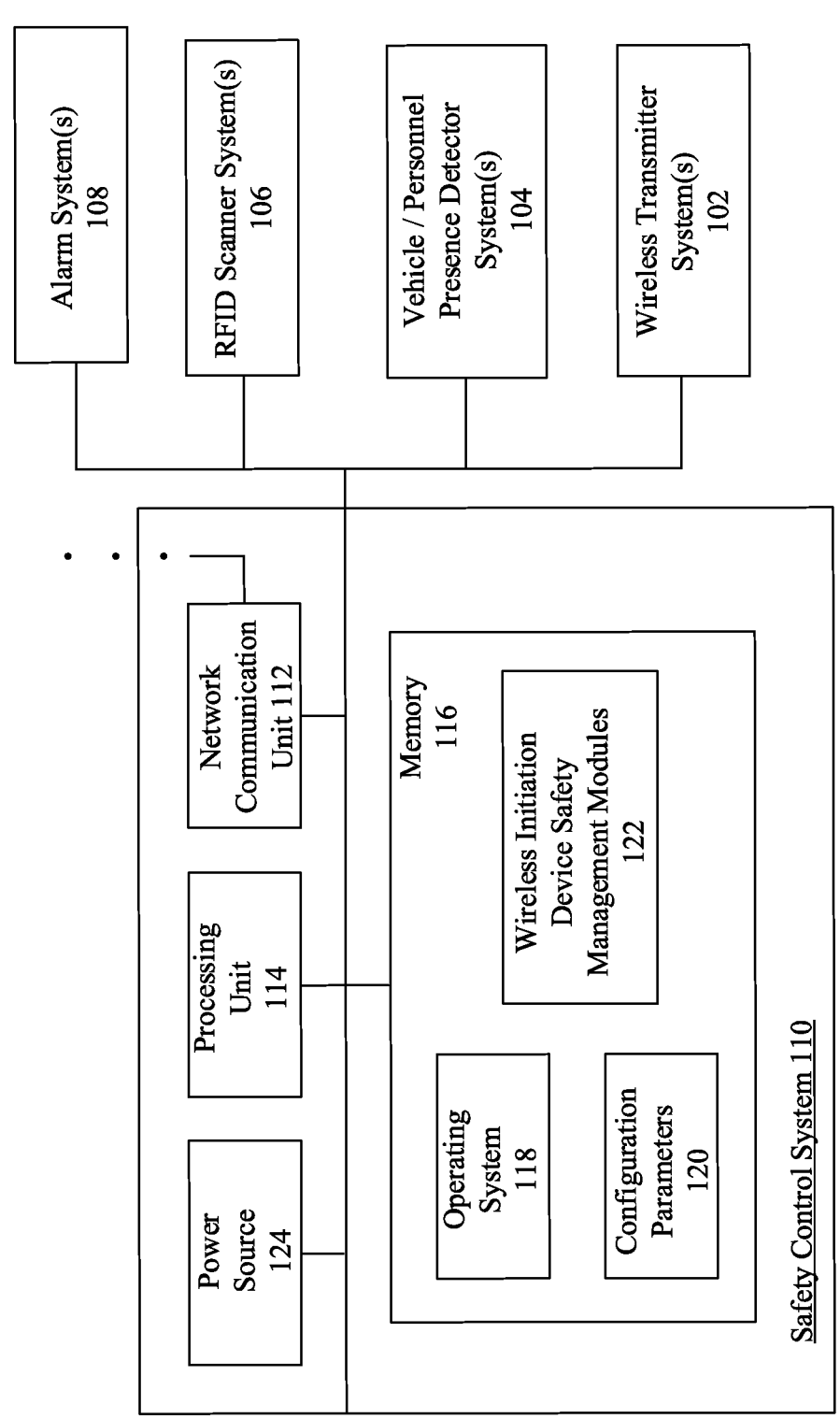
FIG. 1 is a schematic diagram of an alarm/disable system for use with wireless electronic blasting (WEB) systems.

The safety system may include an alarm/disable system 100 (which refers herein to an alarm system, or a disable system, or both an alarm and disable system), which includes at least some of, as shown in FIG. 1:

a) one or more wireless transmitter systems 102;

b) one or more vehicle/personnel presence detector systems 104;

c) one or more RFID scanner systems 106;

d) one or more alarm systems 108; and e) a safety control system 110 in electronic communication with the one or more wireless transmitter systems 102, the one or more vehicle/personnel presence detector systems 104, the one or more RFID scanner systems 106, and the one or more alarm systems 108 (e.g., via a standard secure electronic communications protocol and network).

The alarm/disable system 100 may be referred to as simply a "disable system" in some implementations (or a "WEB-device disable system") because: the safety control system 110 is configured to control the wireless transmitter systems 102 to send at least one wireless DISABLE command to the wireless devices that are within deactivation zones that are defined by locations/orientations of disable antennas of the wireless transmitter systems 102. The DISABLE command may be referred to as a "universal disabling signal". The safety control system 110 may be configured to control the wireless transmitter systems 102 to send the wireless DISABLE command when the vehicle/personnel presence detector systems 104 detects presence of a vehicle/person within one or more detection zones defined by the location, orientation and type of detectors of the vehicle/personnel presence detector systems 104. Alternatively or additionally, the safety control system 110 may be configured to control the wireless transmitter systems 102 to send at least one wireless DISABLE command when the safety control system 110 detects the wireless devices within scanner zones that are defined by locations/orientations of reader antennas of the RFID scanner systems 106.

The alarm/disable system 100 may be referred to as an "alarm system" in some implementations because the safety control system 110 is configured to control the alarm systems 108 to generate alarms when the safety control system 110 detects the wireless devices within scanner zones that are defined by locations/orientations of reader antennas of the RFID scanner systems 106. Alternatively or additionally, the safety control system 110 may be configured to control the alarm systems 108 to generate alarms when the vehicle/personnel presence detector systems 104 detects presence of a vehicle/person within one or more detection zones defined by the location, orientation and type of detectors of the vehicle/personnel presence detector systems 104.

The safety system may be referred to including a "scanner/detector system" that includes:

a) the one or more vehicle/personnel presence detector systems 104 including the detectors that define the one or more detection zones; and/or b) the one or more RFID scanner systems 106 with the reader antennas that define the one or more scanner zones.

As shown in FIG. 1, the safety control system 110 includes:

a) a network communication unit 112 configured to connect with central blasting computing systems (including a central blasting control system) that include blast plans and inventories of the wireless devices that are on the work site, including their identifiers (ID) and which of the wireless devices have been activated and encoded with a blast delay and a group ID (GID) ready to be deployed in a borehole (data which are typically reported back after encoding);

b) at least one processing unit 114 in communication with the network communication unit 112, and the one or more wireless transmitter systems 102, the one or more vehicle/personnel presence detector systems 104, the one or more RFID scanner systems 106, and one or more alarm systems 108, via a data bus and the communications protocols;

c) a memory unit 116, in communication with the processing unit 114, that stores a plurality of operational modules in the form of machine-readable code, including: (1) an operating system 118, e.g., a version of Windows™; (2) configuration parameters 120 stored as persistent data; and (3) wireless initiation device safety management modules 122 that are read and executed by the processing unit 114 to perform the operations of the safety control system 110; and d) at least one power source 124 configured to power at least the processing unit 114, the network communication unit 112 and the memory 116, and potentially one or more of the wireless transmitter systems 102, the vehicle/personnel presence detector systems 104, the RFID scanner systems 106 and the alarm systems 108, depending on their power requirements.

The power source 124 may include a mains electricity connection (e.g., to mine site power), a backup generator and/or solar panels, and one or more batteries (to provide additional backup power). The backup power may be important to maintain the safety of the system, e.g., even if the power (mine site power or mains electricity connection) is cut.

The safety control system 110 may include a casing/housing around the network communication unit 112, the at least one processing unit 114 and the memory unit 116, and optionally the at least one power source 124 (e.g., the power source 124 may be external to the casing/housing in a separate housing/casing/body, e.g., an external battery or solar power supply). The casing/housing may be sealed to mitigate ingress of water, moisture and dust, and may include a hard body to resist impact thereon.

The safety control system 110 may include one or more cooling elements, e.g., mounted on/to the casing/housing, and or inside the casing/housing, to cool the least one processing unit 114 and the memory unit 116 if the ambient temperature is hot. The cooling elements may include passive elements, e.g., thermally conductive potting/paste and fins, and/or active elements, e.g., fans and circulating liquid coolant.

The network communication unit 112 may include a commercially available network interface and connections/couplings (including wireless or wired connections/couplings) to the central blasting computing systems. The at least one processing unit 114 (which includes at least one microprocessor or microcontroller and a general-purpose input-output unit (GPIO)) and the memory unit 116 may include commercially available hardware configured for operation as described herein.

The wireless device safety management modules 122 include: an alarm activation module that controls the processing unit 114 to send an alarm command to the alarm systems 108. The alarm command can include one or a plurality of urgency levels, e.g., "1", "2", "3", "unencoded", "encoded", as further described hereinafter.

The alarm systems 108 are configured to sound, display and or send alarms, including at the plurality of urgency levels, when they receive the alarm command with the urgency level. The alarm systems 108 may include:

a) a visual alarm apparatus/device, e.g., a light with a flash controller, e.g., including a commercially available warning beacon light, with a brightness level and/or flashing speed that increases with the urgency level;

b) an audible alarm apparatus/device, e.g., a speaker with an audio driver, e.g., including a commercially available siren, with an acoustic volume and/or pitch that increases with the urgency level; and/or c) a telecommunications alarm apparatus/device, e.g., a messaging system configured to transmit alarm messages to predefined devices, e.g., including a connection to the central blasting computing systems, and/or a commercially available SMS or paging alarm system, with a message content urgency (e.g., represented in words used) or number of predefined devices that increase with the urgency level.

The alarm systems 108 include one or more casings/housings for the apparatuses/devices, in particular the visual alarm apparatus/device and the audible alarm apparatus/device, which can be mounted around the work site. The casings/housings are sealed to mitigate ingress of water, moisture and dust, and are include hard bodies to resist impact thereon.

The RFID scanner systems 106 include a set of (i.e., one or a plurality of) RFID readers, each with a set of (i.e., one or a plurality of) reader antennas, e.g., including commercially available readers and antennas. The placement and orientation of the scanner antennas define the one or more scanner zones. The scanner antennas can be placed and oriented to partially (e.g., just on one side) or substantially surround or overlap access points with the scanner zones, which are points (strictly areas) through which people/vehicles need to pass to access certain secured portions/areas of a work site. Example access points are described hereinafter. The scanner zones may extend from one or both sides of the access point (area), e.g., in the direction of travel of the vehicle/person, by a selected read distance, e.g., at least substantially 1 m, 2 m, 5 m, 10 m, 15 m, or 20 m. The RFID scanner systems 106 are selected to have a read rate of at least substantially 100, 200, 300, 400, 500, 600, 700, 800, 900, or 1,000 tags per second, i.e., at least fast enough that a person/vehicle walking/driving past the antenna would have all RFID tags in their possession read without having to break stride or slow down. In test implementations, the selected read distance of a test scanner antenna was at least substantially 7 m, 6.5 m, 6 m, 5.5 m, 5 m, 4.5 m, 4 m, 3.5 m, 3 m, 2.5 m, 2 m, 1.5 m, 1 m or 0.5 m, and the read rate was between 600 and 800 tags per second. The at least one reader antenna may include a plurality of reader antennas with non-collinear respective principal axes (because read capabilities are highly dependent on the orientation of the tag in relation to the antennas), e.g., at substantially 90 degrees. The reader antennas may be mutually separated and are aligned such that their respective antenna patterns (along their principal axes) overlap to form the scanner zone or "monitored area" (2D) or "monitored volume" (3D). The scanner zone is defined by the predetermined proximity/distances of the respective reader antennas and/or blocking elements, e.g., walls of the access structure 508. For example, if the tags may be passing through the access point at a plurality of perpendicular angles, then a corresponding plurality of reader antennas may be provided. The reader antennas may be arranged and mutually separated to form a linear array covering the scanner zone. The reader antennas may have principal axes that are mutually separated by at least substantially 5, 10, 15, 20, 30, 40, 45, 60, or 90 degrees (forming an angled array), e.g., substantially 60 degrees if each reader antenna has a reliable range of +30 degrees normal from the antenna face. The at least one reader antenna may include two reader antennas with respective polarizations oriented in two mutually orthogonal directions if the antenna patterns are polarised. The RFID scanner systems 106 include one or more casings/housings for: the at least one reader antenna, and the plurality of RFID readers: the casings/housings are sealed to mitigate ingress of water, moisture and dust, and are include hard bodies to resist impact thereon.

As shown in FIG. 2, the wireless devices may include a tagged wireless device 202 that includes:

a) a control module 206 configured to control initiation of an explosion based on commands from an encoder 204 (also referred to as an "encoding device") and a main blasting controller (which effects the blasting plan), including a GROUP ID (GID) command to program a GID into the wireless device from the encoder 204, a DELAY command to program a delay time into the wireless device from the encoder 204, an ARM command from the blasting controller to arm the wireless device ready to fire, and a FIRE command from the blasting controller to fire a selected range of GIDS according to their pre-programmed delay times;

b) a communications module 208 configured to receive command signals (representing the commands) wirelessly, and to send the command signals to the control module 206 for interpretation and control, wherein the communications module 208 can include: (i) a wired receiver including one or more exposed electrodes or an optical port configured to receive the command signals via an electrode or optical connection, typically from the encoder 204 with corresponding communications electrodes or an optical source; and/or (ii) a near-field communications (NFC) receiver configured to receive the command signals via an NFC connection, typically from the encoder 204 as shown in FIG. 2; (iii) an RF receiver to receive the command signals via a radio connection/coupling, e.g., from an RF transmitter of the wireless transmitter system 102; and/or (iv) an MI receiver configured to receive the command signals via an MI connection/coupling, e.g., from an MI transmitter of the wireless transmitter system 102, e.g., a 3-axis magnetometer;

c) an internal power source 210 configured to store electrical power and supply it to the control module 206 and the communications module 208 to power their operations, including initiation of the explosive;

d) in some implementations, a detonator 212 to fire, initiate or detonate the explosive when triggered, commanded, or fired by the control module 206;

e) in association with the (d) a booster explosive 214;

f) a housing 216 configured to contain and house the control module 206, the communications module 208 and the internal power source 210, and to protect them from moisture/water and from impact, including while being deployed into a borehole and while residing in the borehole, potentially under pressure and under water; and g) an RFID tag 218 (which may include two or three RFID tags 218(A), 218(B), and 218(C)—all referred to herein as "tag 218" for brevity) mounted/attached/molded (e.g., by an adhesive, or by printing, or by molding) to the tagged wireless device 202, e.g., to the housing 216, or just a component of the housing 216 that includes the communications module 208 (since the booster 214 and the detonator 212 may be only attached shortly before deployment into a borehole), wherein the RFID tag 218 includes a unique identifier (ID) to identify this tagged wireless device 202 at the work site.

The tag 218 is typically in the form of a passive RFID tag, e.g., including a commercially available tag antenna and chip, configured to meet relevant RFID frequency requirements, e.g., typically to operate substantially in a selected band between 800 MHz to 1,000 MHz depending on the location/jurisdiction of the work site (e.g., substantially 800 MHz and/or substantially 900 MHz). The tag 218 include a unique pre-programmed, e.g., at manufacture, tag identifier (tag ID), which uniquely identifies the tagged wireless device 202. The tag ID may be referred to as a "DRX ID", "detonator ID", or "booster ID" depending on the nature of the wireless device (which may be a DRX, detonator and/or booster as described hereinafter).

In embodiments, the tagged wireless device may include the tag 218 mounted/attached/molded to a wireless device that includes only components of the tagged wireless device 202, including:

a) the tag 218(A) mounted/attached/molded to the communications module 208 in its housing (e.g., the "DRX") configured to protect the communications module 208 from moisture/water and from impact;

b) the tag 218(B) mounted/attached/molded to the detonator 212 in its housing (e.g., an "IKON" ™ detonator from Orica) configured to protect the detonator 212 from moisture/water and from impact; and/or c) the tag 218(C) mounted/attached/molded to the booster explosive 214 in its housing (e.g., a WebGen™ "booster") configured to protect the booster explosive 214 from moisture/water and from impact.

Generally, as the communications module 208 is responsive to the DISABLE command (and the detonator 212 and the booster explosive 214 are not responsive to the DISABLE command), the system 100 is configured to generate the DISABLE command on detection of a DRX ID in the tag 218(A). The system 100 may be configured to generate the alarm command instead of the DISABLE command on detection of a detonator ID or a booster ID in the tag 218(B),218(C).

As shown in FIGS. 3 and 4, the wireless devices/tagged wireless devices 202 may be stored, transported and carried in storage magazines/boxes, including a small storage box 302 and a large storage box 402.

The vehicle/personnel presence detector systems 104 are configured to send a detection signal to the processing unit 114 when presence of a vehicle/person is detected within one or more detection zones defined by the location, orientation and type of detectors of the vehicle/personnel presence detector systems 104, wherein the detectors may include one or more of the following:

a) optical sensors, including optical beam sensors, that define the detection zones according to where the optical field of view of the optical sensors is, and/or where any optical beams are, including infrared (IR) beams, e.g., commercially available optical motion sensors, or commercially available photoelectric beam systems that detect obstruction of the optical beams, and wherein the vehicle/personnel presence detector systems 104 are configured to generate the detection signal when the optical sensor are activated/cut;

b) electromechanical sensors that are configured to detect when a gate or door is opened by detecting a change in pressure, and that define the detection zones according to the opening space of the gate or door, e.g., a commercially available pressure sensor in a catch, handle, hinge or frame of the gate or door that are configured to detect the opening, and in response control the vehicle/personnel presence detector systems 104 to generate the detection signal;

c) pressure sensors that are configured to detect weight of a person or vehicle (which may be an elevator or lift), where the location of the plates define the detection zones, and that are configured to detect the weight, and in response control the vehicle/personnel presence detector systems 104 to generate the detection signal;

d) acoustic sensors that are configured to detect a sound of movement, or to detect presence of a body by reflected ultrasound, where the range and orientation of the acoustic sensors define the detection zones, and that are configured to detect the sound or reflected sound, and in response control the vehicle/personnel presence detector systems 104 to generate the detection signal;

e) image sensors (e.g., configured for visible light and/or infrared light) that are configured to identify movement of a body/vehicle in a field of view of each image sensor, which define the detection zones, that are configured to detect the movement, and in response control the vehicle/personnel presence detector systems 104 to generate the detection signal, e.g., image capture devices such as cameras; and f) magnetic sensors that are configured to detect presence of a conductive body, including a vehicle, e.g., buried as detector loops in a road or driveway or gateway, where the areas adjacent the magnetic sensors define the detection zones, and where the vehicle/personnel presence detector systems 104 are configured to detect the presence, and in response, to generate the detection signal.

The vehicle/personnel presence detector systems 104 and the alarm activation module of the wireless device safety management modules 122 may be configured to: (i) detect/determine respective travel directions of the vehicle/person through any one or more of the detection zones; and (ii) selectively generate the alarm command and/the or urgency level based on the determined travel direction of each detection zone. The sensors of the vehicle/personnel presence detector systems 104 may be configured to detect and indicate the travel direction, e.g., based on what order an array of the sensors detect the person/vehicle, or based on motion detection in an imaging system. The alarm activation module may be configured to generate the alarm command only for one travel direction, e.g., leaving a storage hut through a doorway. The alarm activation module may be configured to generate the urgency level based on the travel direction.

The vehicle/personnel presence detector systems 104 include one or more casings/housings for the sensors of the detectors, wherein the casings/housings are sealed to mitigate ingress of water, moisture and dust, and are include hard bodies to resist impact thereon.

The one or more wireless transmitter systems 102 include commercially available transmitters and wireless transmitter antennas, including respective signal generators (which may be configured to deliver relatively high current/power depending on the antennas and the sizes of the deactivation zones) configured to receive a command for the wireless device, and configured to drive one or more wireless transmitter antennas (RF antennas or MI antennas) to transmit the command in a wireless signal (electromagnetic or quasi-static) to the wireless device at specific frequencies for which the wireless devices are configured. For example, the wireless transmitter systems 102 could include a high-current signal generator in the form of a WebGen™ fire system transmitter and an MI antenna in the form of a WebGen™ antenna that generates the high power MI signal. The coverage of the wireless signal (RF or MI) is controlled by orientation, position, configuration and power (e.g., based on the drive current) of the wireless transmitter antenna. As mentioned hereinbefore, the deactivation zones are defined by the locations and orientations of the transmitter antennas of the wireless transmitter systems 102. The transmitter antennas may include a coil of conductive wire including one or more loops, with smaller loops (e.g., substantially 0.5 m to 1.5 m in diameter, e.g., substantially 1 m in diameter) for short range transmission, and larger loops (e.g., substantially 5 m to 80 m in diameter, or substantially 20 m to 60 m in diameter, e.g., substantially 40 m in diameter) for longer range transmission. The range of the transmitter antennas can be substantially 5 m to 80 m in diameter, 10 m to 25 m. e.g., substantially 5 m to 80 m in diameter, 15 m. At least the MI transmitter can transmit the disable signals through walls and through the earth (TTE), and in some implementations, into the interior of vehicles and storage boxes/magazines for the wireless devices. The MI antenna, the deactivation zone is generally along the principal axis of the MI antenna, so the MI antennas are arranged with principal axes directed to and through each deactivation zone. Each MI antenna may define a deactivation zone generally along the principal axis and with a cross-section defined by the coil size. The wireless transmitter systems 102 may include a plurality of the RF and/or MI antennas (depending in whether the wireless devices are configured to receive RF and/or MI), including: a plurality of the antennas defining one deactivation zone (e.g., having non-overlapping principal axes); and a plurality of deactivation zones, each with one or more antennas.

Management Modules and Alarm/Disable Process or Method

The alarm activation module of the wireless device safety management modules 122 may be configured to selected the urgency level based on a count/number of the wireless devices (e.g., just 1, more than 1, more than 5, more than 10, more than 15 (e.g., including a box of 20), more than 30 (e.g., including a box of 40), more than 50, or higher) that are detected by the RFID scanner systems 106 within a preselected time period (e.g., up to 1 second, or up to 10 seconds, or up to 30 seconds, or up to 60 seconds), and/or within a preselected one or more of a set of scanner zones defined by the scanner antennas (described hereinbefore). For example, a lower urgency level may be selected/generated if the RFID scanner systems 106 signal to the processing unit 114 that only 1 wireless device has been detected in a scanner zone predefined as low risk (e.g., in scanner zone properties data in the memory 116, based on a scanner zone ID associated with the corresponding RFID antennas). In another example, a higher urgency level may be selected/generated if the RFID scanner systems 106 signal to the processing unit 114 that a substantial plurality (e.g., more than 10) different wireless device ID have been scanned in a scanner zone, optionally if the scanner zone is redefined as high risk.

The wireless device safety management modules 122 are configured to cause the processing unit 114 to perform an alarm/disable process or method that includes: the processing unit 114, on receipt of the detection signal and/or the alarm signal, sending the DISABLE command to the wireless transmitter systems 102.

The DISABLE command may include:
a) a GID command with a value of NULL (e.g., zero or clear) so the wireless device no longer has a GID corresponding to any GID, at least any GID in the blast plan, so cannot initiate a firing sequence, even if ARM and FIRE commands are received, as long as a GID is sent with all blasting commands;
b) a DELAY command with a value of NULL (e.g., clear) so the wireless device no longer has a valid delay value, and cannot initiate a firing sequence, even if ARM and FIRE commands are received;
c) a RESET command to reset all stored values in the wireless device to their factory settings, e.g., removing the GID and DELAY values, and thus removing any encoding of the wireless device; and/or
d) a drain-battery command, or similar, to activate a safety mechanism that drains all power from the internal power source 210 so the wireless device has no remaining electrical power, so cannot initiate a firing sequence, or receive ARM or FIRE commands.

The DISABLE command acts as a state transition signal or command by which a set of the wireless initiation device can be or is transitioned to a safe/standby mode or a reset/disabled state, including after the set of the wireless initiation device has been programmed/encoded.

The DISABLE command may be sent to the wireless transmitter systems 102 with an urgency level that controls analog properties of the RF or MI transmissions, e.g., the transmission power may be increased for a higher urgency level. Alternatively, the wireless device safety management modules 122 may be configured to cause the processing unit 114 to send the DISABLE command to different ones of the wireless transmitter systems 102 depending on the urgency level, e.g., a higher urgency DISABLE command may be sent to more and/or large (r) antennas.

The wireless device safety management modules 122 may be configured to cause the processing unit 114 to:
a) receive an ID of a wireless device scanned by the RFID scanner systems 106 in the scanner zones;
b) request a status of associated with the ID from the blasting computing systems (from a central database including encoding data from the encoders); and
c) if the status is "encoded", generate the alarm command with the "encoded" urgency level.

If the alarm command has an "encoded" urgency, representing that that wireless device has been encoded according to data in the blasting computing systems, the wireless device safety management modules 122 are configured to cause the processing unit 114 to send the DISABLE command to more and/or large (r) antennas, e.g., all antennas on the site since an encoded wireless device in the wrong place may contravene certain safety protocols.

The management modules 122 may be configured to control the processing unit 114 to send the DISABLE signals (wireless signals representing the DISABLE command) whenever the vehicle/person passes through the detection zone so that active/encoded wireless devices are disabled/deactivated whenever they are moved between portions of the work site separated by the access point (area) that overlaps the detection zone (e.g., between active and safe areas of the site).

The management modules 122 may be configured to control the processing unit 114 to send the DISABLE command when the vehicle/person passes through the detection zone in a predefined direction for that detection zone; thus the wireless device safety management modules 122 may selectively generate the DISABLE command based on the determined travel direction of each detection zone.

The management modules 122 may be configured to control the processing unit 114 to send the DISABLE command to a selected set of the deactivation zones based on: which of the detections zones detected the person/vehicle: for example, the selected deactivation zone may substantially match the size of the detection zone, or the deactivation zone may be substantially larger than the detection zone (e.g., more than double in area, or more than 5 times larger, or more than 10 times larger, e.g., an entire mine site or a fenced/walled portion of a mine site containing the detection zone.

The management modules 122 may be configured to control the processing unit 114 to send the DISABLE command with: a wireless device ID and/or a wireless device GID in order to selectively disable only wireless devices in the deactivation zone with a matching ID or GID.

For example, when the DISABLE command includes a DELAY command, this may include a device ID and/or a GID, and only wireless devices with a matching ID or GID will respond to this command by setting the delay time, which for a DISABLE command would represent a null action, e.g., a value of NULL. The management modules 122 may be configured to select the set of the deactivation zones to receive the DISABLE command depending on whether the DISABLE command includes an ID (or a set of IDs) or a GID (or a set of GIDs): e.g., a larger set of the deactivation zones may be selected if a larger number of the wireless devices is being deactivated, e.g., if all devices with a selected GID are being deactivated.

In some implementations, the RFID scanner systems 106 may include on-board a scanner memory and a scanner microprocessor (including a GPIO module) that are configured to: store a definition of a set of IDs of the tagged wireless devices 202 (e.g., a list of the IDs of the encoded wireless devices obtained from the central blasting computing systems), and identify to the processing unit 114 whether any of the scanned IDs are in the stored set of IDs (e.g., whether any of the scanned IDs correspond to encoded tagged wireless devices 202), and the management modules 122 can be configured to control the processing unit 114 to then generate the alarm command with the "encoded" urgency level.

Figure 11:
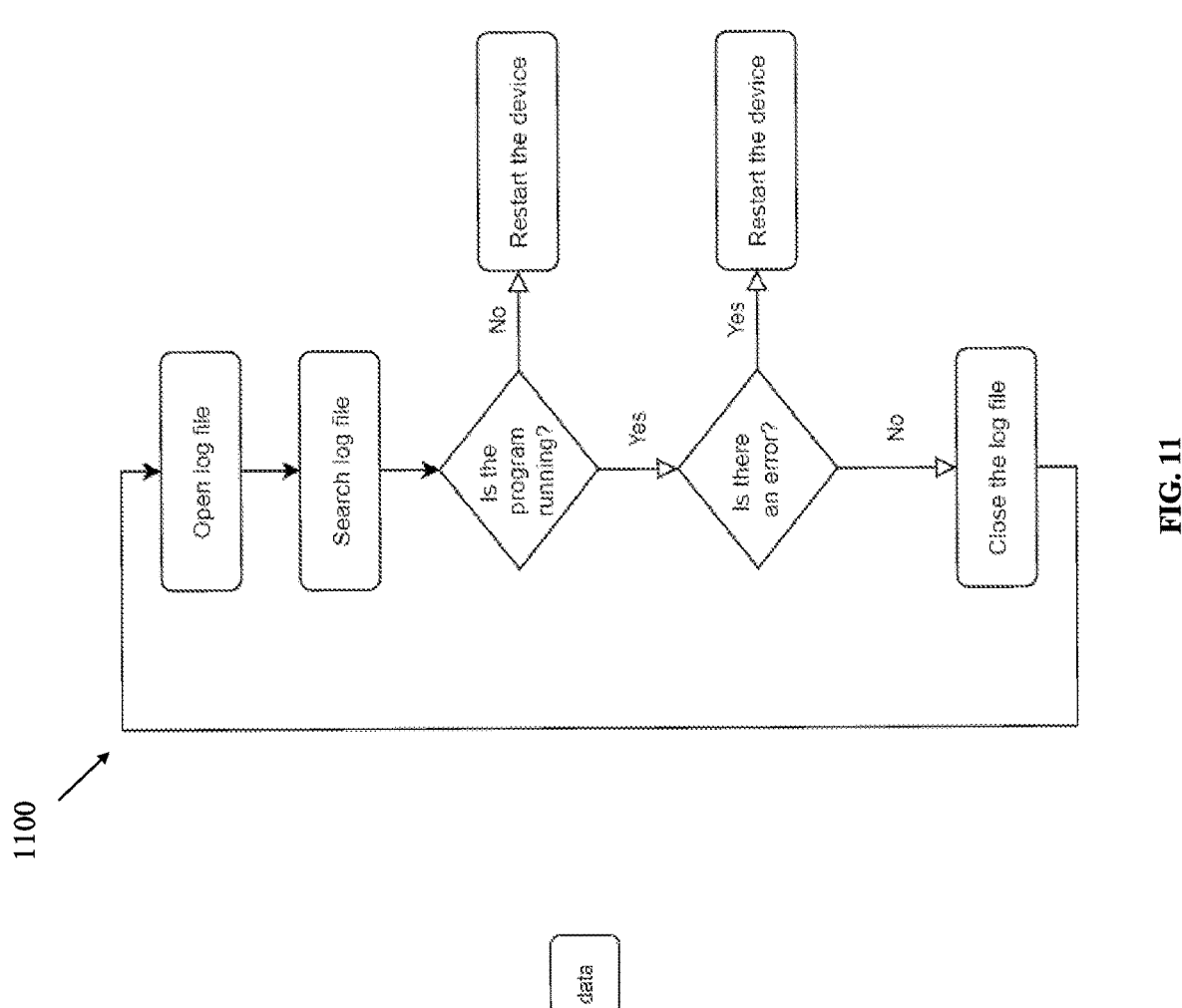
FIG. 11 is a flow chart of a fault detection process of the alarm/disable system.
Figure 10:
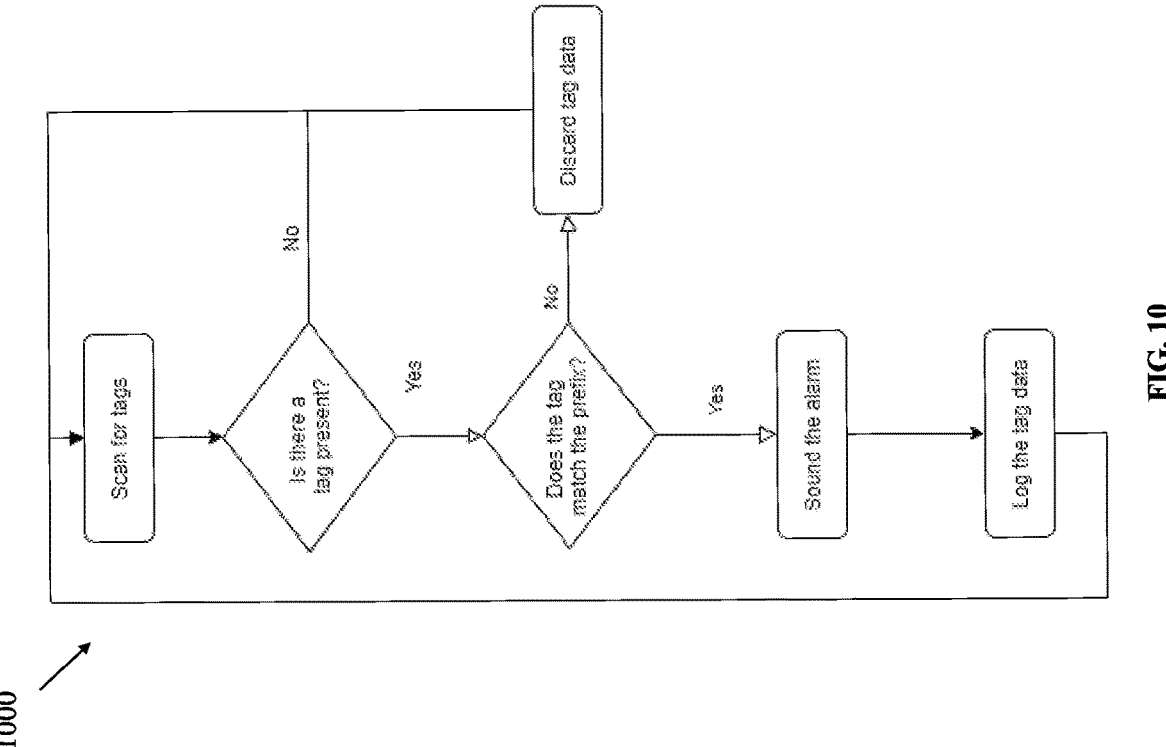
FIG. 10 is a flow chart of a scanning and differentiation process of the alarm/disable system.

For safety reasons, continuous (e.g., near-continuous/rapidly recurrent) background reading of the tags provided by the RFID scanner systems 106 may be important. The wireless device safety management modules 122 may be configured to cause the processing unit 114 to continuously monitor for the tags in a routine scanning process. Additionally or alternatively, the on-board a scanner memory may be configured to cause the scanner microprocessor (also referred to as a "scanner processor") to continuously monitor for the tags in the routine scanning process. As shown in FIGS. 10 and 11, the routine scanning process includes a scanning and differentiation process 1000 and a fault detection process 1100 that both run continuously and independently. The routine scanning process may be implemented as a plurality of scripts in the management modules 122 or reader memory.

As shown in FIG. 10, the scanning and differentiation process 1000 (or "scanning process") includes at least some of:

a) continuously (e.g., near-continuous/rapidly recurrent) reading for tags in the scanner zone ("scan for tags");

b) matching scanned tag IDs (e.g., based on TD prefixes) with the set of stored IDs ("does the tag match the prefix?");

c) the processing unit 114 communicating with the central blasting computing systems to determine respective statuses of the wireless devices associated with the scanned tag IDs (from the central database including the encoding data from the encoders); and d) based on the respective determined status, determining/selecting the alarm/alert signal type and the urgency level (e.g., high urgency for an encoded wireless device, as described hereinbefore);

e) sending an alarm/alert signal, optionally with an alert level, to the processing unit 114 ("sound the alarm"); and f) logging data, including the scanned tag IDs, to a file in the memory 116 and/or scanner memory ("log the tag data")

As shown in FIG. 11, the fault detection process 1100 includes:

a) reading the log file ("open log file" and "search log file");

b) detected whether there is an error ("is the program running?" and "is there an error?");

c) if there is a detected error, restating/rebooting the relevant RFID scanner system 106 ("restart the device"); and d) if the RFID scanner system 106 is being restarted/rebooted, send a signal to the processing unit 114 to send an alarm signal (at least to activate a nearby/adjacent alarm apparatus) until the relevant RFID scanner system 106 is again performing the scanning and differentiation process 1000 after restarting/rebooting, e.g., for at least one minute or 2.5 minutes (reboot alarm process).

In implementations, if a plurality of RFID scanner systems 106 have substantially overlapping scanner zones, the wireless device safety management modules 122 may be configured to only send the alarm signal in the reboot alarm process if all of the overlapping RFID scanner systems 106 are being restarted/rebooted. In some implementations, the reboot process ("restart the device") may be initiated by the processing unit 114 or the scanner processor if a thermal detector/warning signal is received (e.g. by the respective GPIO) indicative of a thermal risk, substantial increase in temperature, in order to mitigate thermal damage or read performance being limited by thermal effects (e.g., due to a reader throttling at high temperatures).

Work Site and WEB System

Figure 5:
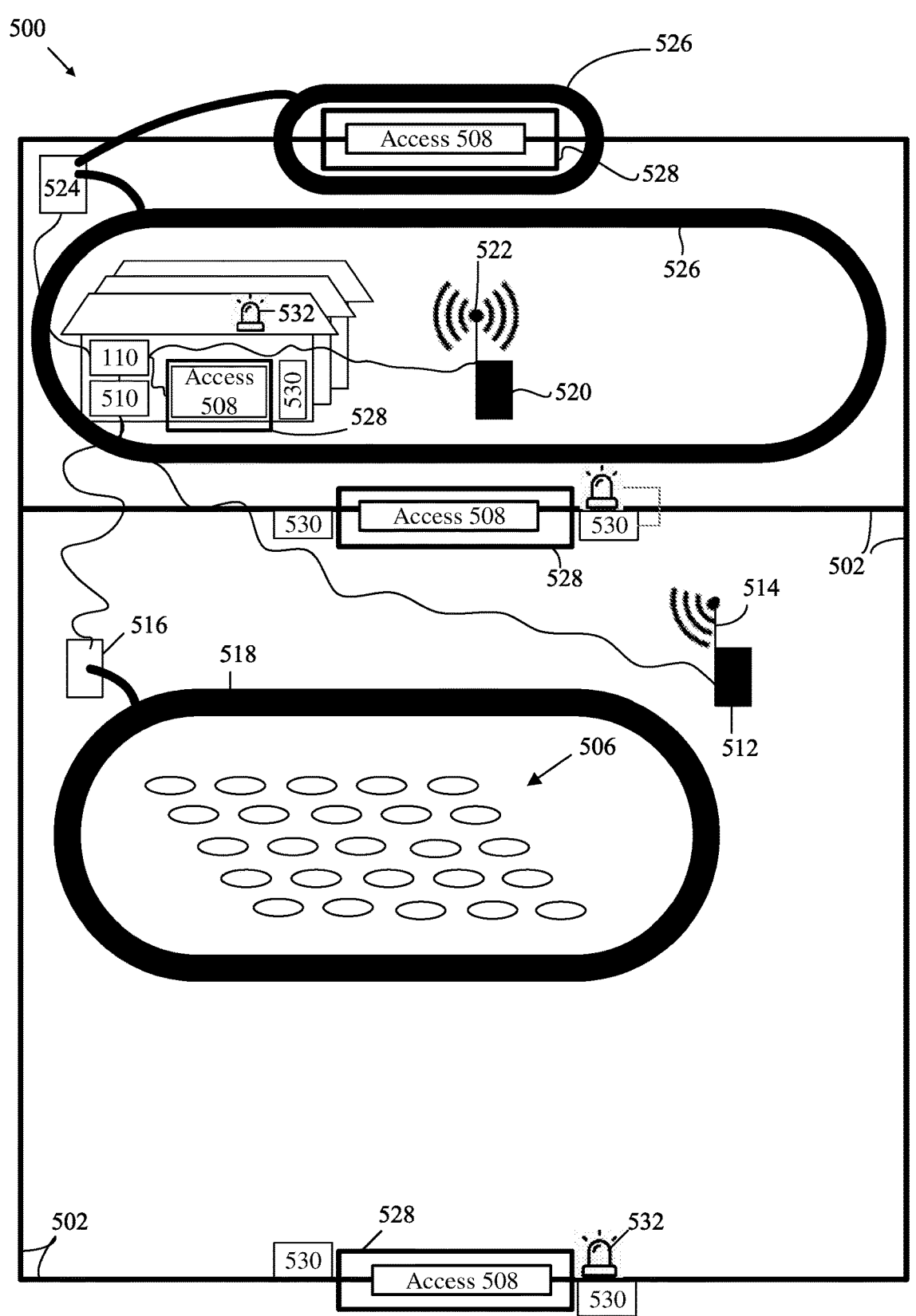
FIG. 5 is a diagram of an above-ground site with the alarm/disable system.
Figure 6:
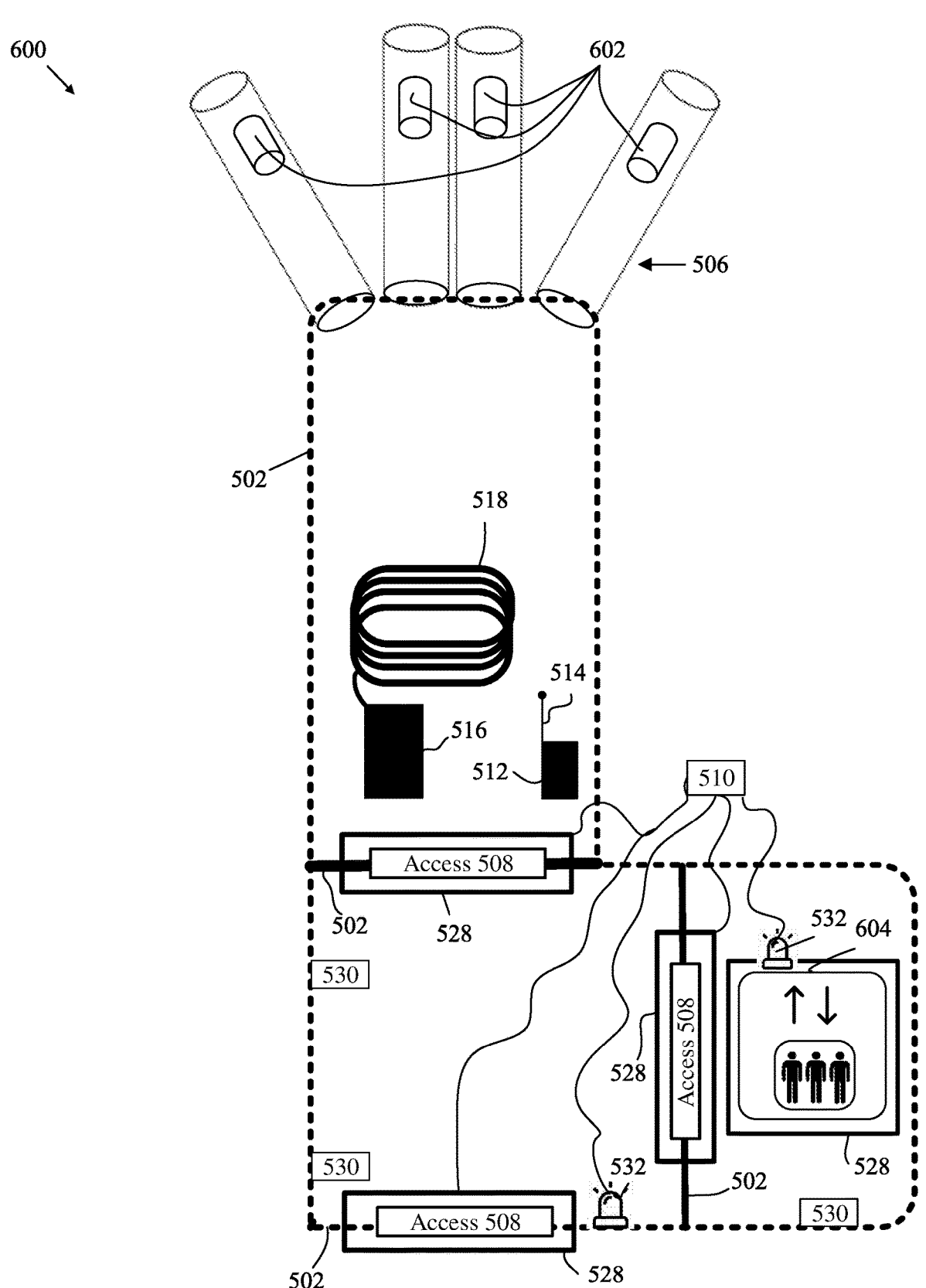
FIG. 6 is a diagram of an underground site with the alarm/disable system.

As shown in FIGS. 5 and 6, the alarm/disable system 100 may be implemented in a work site, including in an above-ground site 500 and/or an underground site 600.

As shown in FIG. 5, the above-ground site 500 can include:

a) one or more boundary structures 502 (including walls and fences) around the site 500 that inhibit movement and access of people/vehicles into and out of the mine site 500, particularly inhibiting access from and to the site storage structures 504 (e.g., site buildings, storage cages, secure shelters, huts, transportable buildings, storage magazines, etc.) and to and from the boreholes 506, i.e., the area where the blasting operations are planned to occur and/or are occurring;

b) one or more access structures 508, including gates, tunnels, doorways, portals, openings, entrances, exits, walkways and/or driveways that provide access for the vehicles/people through the boundary structures 502 and into/from the storage structures 504, and that define access points for the vehicles/people—the "access points" are each an area or a volume that must be passed through by the vehicle/person while passing from through/past the access structure 508, e.g., a gate area defined by sides and floor of a gate and a height of the gate (if it has a lintel) or a selected likely detection height (e.g., high enough to detect a passing person/vehicle), or a door area defined by the door jambs, lintel and sill, or a tunnel area defined by an aperture of the tunnel; and c) a WEB system including a blast controller 510 that is configured to send, relay, and/or verify the wireless blasting commands directed to the wireless devices, and which is connected/connectable to the central blasting computing systems to transfer blast plans etc., and one or more signal generators connected to the blast controller 510 to receive signals representing the blasting commands, e.g., an RF signal generator 512 configured to drive an RF antenna 514 mounted and configured to direct the RF signals toward or to wireless devices in the boreholes 506, and/or an MI signal generator 516 configured to drive an MI antenna 518 mounted and configured to direct the MI signals toward or to wireless devices in the boreholes 506 (including through the air, earth, rock, stemming, soil, concrete, brick and/or water)—the signal generators (including the RF signal generator 512 and the MI signal generator 516 may be configured to deliver relatively high current/power depending on the antennas and their required operating ranges).

The alarm/disable system 100 is integrated with other components of the WEB system, including by its communication with the central blasting computing systems and by its mounting/installation in the work site (as described hereinafter), so may itself be described as a component of the WEB system.

As shown in FIG. 5, the safety control system 110 can be protected from weather and secured in a site building, which is one of a plurality of site storage structures 504.

As shown in FIG. 5, in the above-ground site 500, the one or more wireless transmitter systems 102 of the alarm/disable system 100 can include:

a) one or more signal generators connected to and controlled by the safety control system 110 to receive signals representing the DISABLE command, wherein the signal generators can include: (i) an RF signal generator 520 configured to drive at least one RF disable antenna 522 mounted (by at least one mount/fastener configured to hold/fasten/embed the antenna) and configured to direct the RF disable signals to wireless devices in the deactivation zones; and/or (ii) an MI signal generator 524 configured to drive one or more MI disable antennas 526 mounted (by at least one mount/fastener configured to hold/fasten/embed the antenna) and configured to direct the MI disable signals to wireless devices in the deactivation zones;

b) the at least one RF disable antenna 522 configured to transmit the signals representing the DISABLE command into the air, the vehicles and/or the storage boxes; and c) the one or more MI disable antennas 526 configured to transmit the signals representing the DISABLE command into the air, earth, rock, stemming, soil, concrete, the vehicles and/or the storage boxes.

As shown in FIG. 5, in the above-ground site 500, the one or more vehicle/personnel presence detector systems 104 include access detector systems 528 surrounding and/or adjacent the access structures 508. The access detector systems 528 are mounted (by at least one mount/fastener configured to hold/fasten/embed the detector(s)) and configured to cover and/or cross the access point of the corresponding access structure 508 in a manner that depends on the components of the vehicle/personnel presence detector system 104 described hereinbefore, i.e., the access detector systems 528 and mounted and configured to provide their detection zones to define/provide the detection zones overlapping the access points (areas).

As shown in FIG. 5, in the above-ground site 500, the one or more RFID scanner systems 106 include scanner antennas 530 mounted adjacent to and/or surrounding one or more of the access structures 508 to cover and/or cross the access point of the corresponding access structure 508 in a manner that depends on the components of the RFID scanner systems 106 (e.g., including beam pattern and RF power and sensitivity) to define/provide the scanner zones overlapping the access points (areas). The scanner antennas 530 are mounted by at least one mount/fastener configured to hold/fasten/embed the scanner antennas 530 in/at its selected location and orientation.

As shown in FIG. 5, in the above-ground site 500, the visual alarm apparatus and/or the audible alarm apparatus may have their associated alarm devices 532 (e.g., lights/speakers) mounted to and/or mounted adjacent to the storage structures 504 and/or the access structures 508 such that the audio/visual alarm signals are emitted: (i) adjacent each access structure 508 when a tagged wireless device 202 is scanned in its associated scanner zone (defined by the scanner antennas 530 that are adjacent to or associated with the access structure 508); and (ii) at points on the site 500 that are not with audio/visual receiving distance (by a person) of the associated scanner zone but where people might be present, e.g., at the storage structures 504 or at the access structures 508 distant from the scanner zone that scans the tagged wireless device 202.

In the above-ground site 500, the one or more RF and MI antennas 522,526 may include a plurality of antennas mounted and located with overlapping signal/beam distributions/patterns to cover, with sufficient RF/MI signal power to disable wireless devices therein: (i) an access point (i.e., area) defined by an access structure 508 where wireless devices are scanned (in implementations where the management modules 122 control the processing unit 114 to send the DISABLE command when a tagged wireless device 202 is scanned); and/or (ii) a portion of the mine site 500, e.g., an entire storage structure 504 or an entire portion of the mine site 500 surrounded by the boundary structures 502, e.g., a safe area separated from the boreholes 506 by at least one of the boundary structures 502. An example MI antenna 526 can be located/mounted/embedded under (e.g., in the ground) or around or both sides of an access structure 508 or of the portion of the mine site 500. An example RF antenna 522 can be located/mounted on both sides of an access structure 508 and/or at a plurality of locations around the portion of the mine 500 such that the respective signal/beam distributions/patterns overlap and such that there are no substantial dead spots across the corresponding access point (area) or mine site portion. The RF/MI antennas 522/526 are thus configured (with selected signal/beam distributions/patterns, and RF/MI power) and mounted (with at least partially overlapping signal/beam distributions/patterns) so that the selected deactivation zone overlaps with the access point (area) or the mine site portion.

As shown in FIG. 6, the underground work site 600 can include:

a) the one or more boundary structures 502 (including walls, i.e., tunnel walls, and fences) around the site 600;

b) the one or more access structures 508 (including one or more elevators 604, gates, tunnels, doors, portals, walkways and/or driveways) defining the respective access points;

c) the WEB system including the blast controller (equivalent to blast controller 510, not shown in FIG. 6, e.g., potentially located remotely, such as above ground or in a safe tunnel), the RF signal generator 512 configured to drive the RF antenna 514 mounted and configured to direct the RF signals toward or to wireless devices 602 in the boreholes 506, or the MI signal generator 516 configured to drive an MI antenna 518 (e.g., a quad-loop antenna) mounted and configured to direct the MI signals toward or to the wireless devices 602 in the boreholes 506 (including through the air, earth, rock, stemming, soil, concrete, brick and/or water);

d) the safety control system 110, e.g., located in a safe tunnel or a secure site structure underground or above ground;

e) one or more signal generators, including an RF signal generator (equivalent to RF signal generator 520) configured to drive at least one RF disable antenna (equivalent to the RF disable antenna 522) mounted and configured to direct the RF disable signals toward or to wireless devices in the deactivation zones; and/or (ii) an MI signal generator (equivalent to the MI signal generator 524) configured to drive one or more MI disable antennas (equivalent to MI disable antennas 526) mounted and configured to direct the MI disable signals toward or to wireless devices in the deactivation zones;

f) the at least one RF disable antenna configured to transmit the signals representing the DISABLE command into the air, the vehicles and/or the storage boxes, configured and mounted such that the deactivation zones overlap with the access points (area) and/or the selected mine site portion, e.g., a safe area in the tunnel separate from the boreholes 506 by at least one of the boundary structures 502;

g) the one or more MI disable antennas configured to transmit the signals representing the DISABLE command into the air, earth, rock, stemming, soil, concrete, the vehicles and/or the storage boxes;

h) the access detector systems 528 mounted/positioned surrounding and/or adjacent the access structures 508 to define/provide the detection zones overlapping the access points (areas), including around or on opposite facing sides of the lift/elevator 604;

i) the one or more scanner antennas 530 mounted adjacent to and/or surrounding one or more of the access structures 508 to cover and/or cross the access point of the corresponding access structure 508 in a manner that depends on the components of the RFID scanner systems 106 (e.g., including beam pattern and RF power and sensitivity) to define/provide the scanner zones overlapping the access points (areas);

j) the associated alarm devices 532 (e.g., lights/speakers) mounted to and/or mounted adjacent to the access structures 508 such that the audio/visual alarm signals are emitted: (i) adjacent each access structure 508 when a tagged wireless device 202 is scanned in its associated scanner zone (defined by the scanner antennas 530 that are adjacent to or associated with the access structure 508); and (ii) at points on the site 500 that are not with audio/visual receiving distance (by a person) of the associated scanner zone but where people might be present, e.g., at the access structures 508 (e.g., the lift/elevator 604) distant from the scanner zone that scans the tagged wireless device 202.

In some implementations, the safety control system 110 may connect/couple communicatively to the RF signal generator 512 and/or the MI signal generator 516 (e.g., directly from the safety control system 110 to the RF signal generator 512 and/or the MI signal generator 516, or via the blast controller 510), such that the processing unit 114 can control/drive the RF signal generator 512 and/or the MI signal generator 516 to wirelessly transmit the DISABLE command via the existing mine-site antennas used for commanding the wireless devices, including near and/or in their boreholes, including the RF antennas 514 and/or the MI antennas 518. The management modules 122 may be configured to control the processing unit 114 to send the DISABLE command via the existing mine-site antennas when the selected deactivation zone(s) is/are relatively large, e.g., including substantial portions of the mine site, including optionally selected one/groups of the boreholes 506. For example, if one or more example wireless devices are scanned leaving a selected storage area, e.g., a magazine, in a vehicle travelling in a selected travel direction, and these example wireless devices all have one or more GIDs associated with encoded devices, the management modules 122 may be configured to issue the DISABLE command to as much of the mine site as possible, including via the mine-site antennas (including the RF antennas 514 and/or the MI antennas 518) and the safety system antennas (including the RF disable antenna 522 and the MI disable antennas 526).

In the above-ground site 500, and/or in the underground work site 600, the RF antennas 514 may optionally be configured and positioned/located relative to the boreholes 506 (e.g., around or bordering an array of boreholes 506), including being configured to emit selected RF frequencies (including substantially 20 kHz to substantially 300 GHz), such that the DISABLE command travels substantially or primarily through the air (TTA), including substantially along a line of sight (LOS), rather than substantially or primarily through the earth (TTE) such that ones of the wireless devices that are secured/buried/deployed in the boreholes 506 (e.g., devices 602, which can be configured to respond to ARM and/or FIRE commands by way of magnetic induction signals) do not detect/receive the DISABLE command, whereas any ones of the wireless devices that are not secured/buried/deployed in the boreholes 506 (e.g., because they have fallen out from a borehole, or have mistakenly not been secured/buried/deployed in a borehole 506) do detect/receive the DISABLE command, and are therefore potentially disabled (e.g., based on whether they match the device ID or GID in the DISABLE command). The TTA signals at the selected RF frequencies do not substantially or primarily penetrate into the boreholes 506, or at least when the boreholes 506 or the wireless devices disposed or deployed therein are substantially deeper than 1 m, 5 m, 10 m, 15 m or 20 m (e.g., relative to the opening(s) of the borehole(s) 506), and/or when the borcholes 506 are substantially filled/loaded with explosive materials and/or stemming materials that bury/cover the wireless devices. At least for the TTA RF signals, the selected RF frequencies emitted by the RF antennas 514 may include frequencies in the high frequency (HF) range, 3 to 30 MHZ, in the very high frequency (VHF) range, 30 to 300 MHZ, in the ultra high frequency (UHF) range, 0.3 to 3 GHZ, and/or in the super high frequency (SHF) range, 3 to 30 GHz. At least for the TTA RF signals, the RF antennas 514 may include RF antennas in an existing mine-site wireless network, e.g., an existing wireless communications/control network (e.g., used for autonomous haulage/drilling, Wi-Fi™ based on the IEEE 802.11 standard, slope monitoring, WLAN, process control, Bluetooth™, etc.), including 5 GHz, 3 GHz and/or microwave frequencies. At least for the TTA RF signals, the RF antennas 514 may include RF antennas in a telecommunications network, e.g., configured for 3 G, 4 G, LTE, and/or 5 G telecommunications, e.g., based on existing cell towers and/or an existing wireless communication mesh network.

The RF antennas 514 and/or the MI antennas 518 may be configured/configurable for issuing the DISABLE commands in at least one deactivation zone, including a first selected deactivation zone within which resides an array of the borcholes 506 formed in a geologic formation for carrying out a commercial blasting operation. The system 100 may be utilized in the performance of a process including:

a) loading the array of boreholes 506 with wireless devices 202 (e.g., manually or by way of semi-automated or automated equipment, e.g., in association with loading the boreholes 506 with explosive compositions such as emulsion explosive compositions) that respond to ARM and FIRE commands by way of TTE magnetic induction signals (for the geological materials adjacent to the first selected deactivation zone in which the borcholes 506 are arranged), wherein the wireless devices 202 loaded into the array of boreholes 506 are loaded to borehole depths relative to the opening of the borehole 506 at which the wireless devices cannot receive the TTA RF signals generated by the RF antennas 514 corresponding to the first selected deactivation zone, and wherein the wireless devices 202 are configured/configurable/encodable for detonating explosive compositions loaded into the array of boreholes 506 by way of executing the FIRE commands; and b) after the array of boreholes 506 is loaded with the wireless devices 202:

i) repeatedly/continuously transmitting the DISABLE commands by way of the RF antennas 514 corresponding to the selected first deactivation zone, e.g., every 1-"k" seconds, or every 1-"k" minutes, where "k" is a value between 1 and 100; and/or ii) detecting the presence of one or more of the wireless devices 202 in the selected first deactivation zone by way of its RFID tag(s) 518, and—in response to such detection—transmitting one or more of the DISABLE commands by way of the RF antennas 514 within the selected first deactivation zone, at least until the completion of the commercial blasting operation including detonation of the explosive compositions in the array of boreholes 506.

By using TTE MI signals for the ARM and FIRE commands, combined with using TTA RF signals for the DISABLE commands (which may include selected GIDs), the mine site can be rendered more safe once the wireless devices 202 (optionally with the selected GIDs) are substantially in the boreholes 506 where they cannot receive the TTA RF signals but where they can receive the TTE MI signals. These TTA RF disable signals may define the first selected deactivation zone that disables the wireless devices 202 (optionally with the selected GIDs) if they are dropped/misplaced/fall from the boreholes 506, etc. As the TTA RF disable signals may be generated using an existing wireless communications/control network, it may be efficient to create the first selected deactivation zone in areas where people and machinery are operating/moving/present.

Storage Structure

The site storage structures 504 may include a container 700, configured to securely store a plurality of the wireless devices, including tagged wireless devices 202, in storage boxes, 302,402. As shown in FIG. 7, the container 700 may include: a shipping container body 702; an access structure 508 in the form of a doorway 704 in the container body 702, which includes an openable door 706; an alarm device 532 including a light mounted externally on the container body 702 and adjacent to the doorway 704; and scanner antenna 530 mounted externally on the container body 702 and adjacent to the doorway 704, wherein the scanner antenna 530 defines a scanner zone 708 that overlaps the access point defined by the doorway 704 (i.e., such that a person/vehicle who passed through the doorway also passes through the scanner zone 708). As shown in FIG. 7, the scanner zone 708 may extend from the doorway 704 to be larger than the access point, e.g., to extend the scanner zone by a selected range beyond the access point, e.g., to a selected radius or distance, e.g., of 5 meters. The container 700 may be a magazine for the wireless devices that is equipped with the alarm/disable system 100, thus such a magazine has a reliable technology for detecting specified RFID labels of the tagged wireless devices 202 (specified in the ID data from the central blasting computing systems) when they enter a restricted zone defined by the scanner zone.

Gateway

As shown in FIG. 8, the access structure 508 may be an aperture or tunnel entrance/exit 802 that has been formed to access the work site. As shown in FIG. 8, the entrance/exit 802 can have mounted thereto a MI transmitter antenna 526 in the form of a horizontal loop 804 with a MI signal distribution substantially covering the access point (area) defined by the entrance/exit 802, and a substantial distance along the tunnel so there is time for the DISABLE signal to be received by the wireless device from the loop 804, e.g., if a vehicle 806 is driving at a normal speed, e.g., above 20 kph, defining/providing the deactivation zone overlapping the access point (areas). Alternatively or additionally, the entrance/exit 802 may have mounted thereto a set of the RF disable antennas mounted such that their beam pattern(s) define/provide the deactivation zone overlapping the access point (area). The entrance/exit 802 can have mounted thereto the safety control system 110. The entrance/exit 802 can have mounted thereto the access detector systems 528 in the form of non-contact detector units 808 on facing sides of the entrance/exit 802, each including non-contact detectors to detect the vehicle 806 or a person traversing the access point (area), e.g., optical beam and/or image detectors, defining/providing the detection zone overlapping the access point (areas). The entrance/exit 802 can have mounted thereto the one or more scanner antennas 530 in the non-contact detector units 808 on facing sides of the entrance/exit 802, thus defining/providing the scanner zone overlapping the access point (areas).

Tunnel

Figure 9:
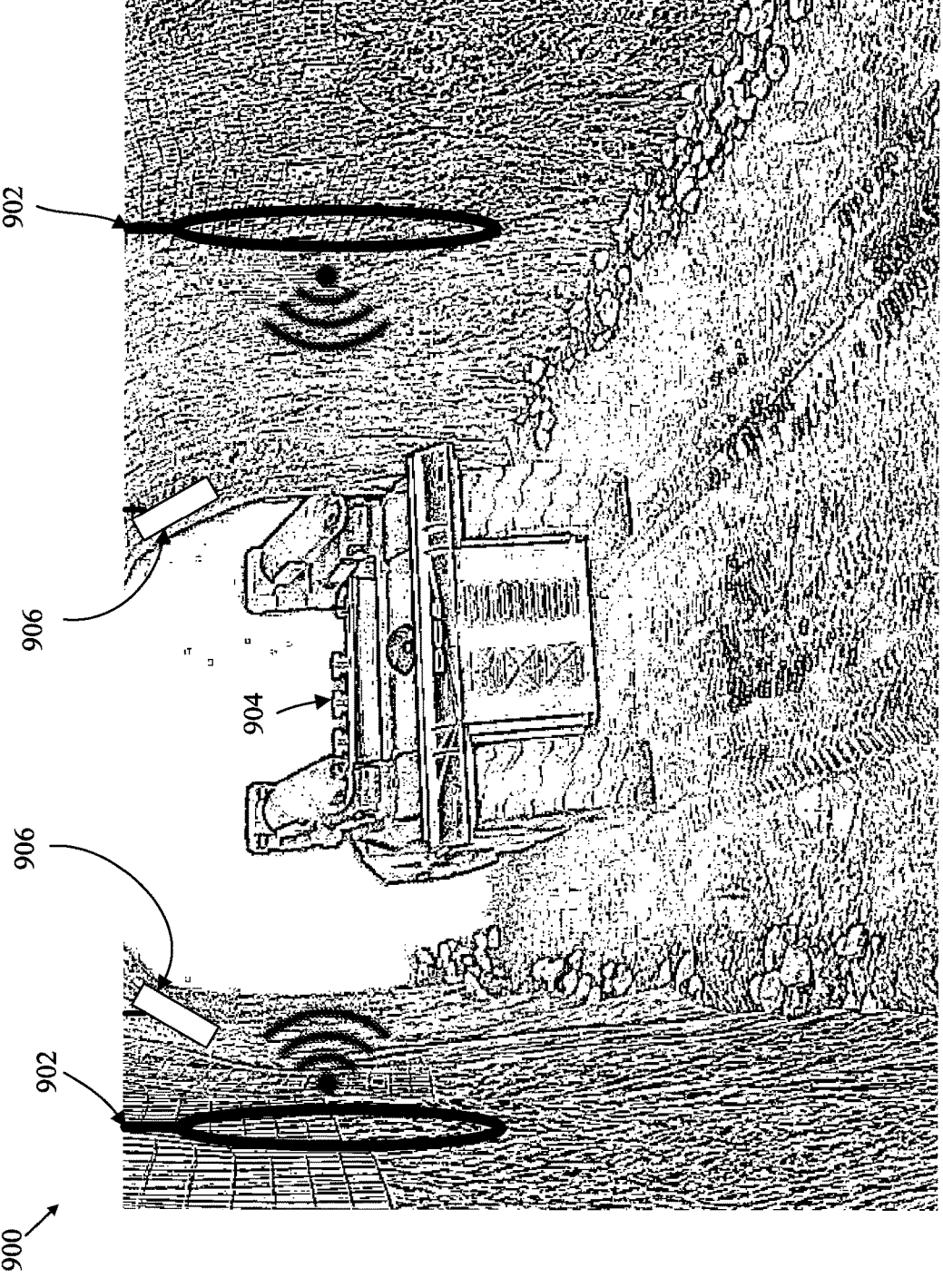
FIG. 9 is a sketch of a tunnel with the alarm/disable system.

As shown in FIG. 9, the access structure 508 may be a length of tunnel 900 that has been formed to access the work site. As shown in FIG. 9, the tunnel 900 can have mounted thereto, on facing walls, a pair of facing MI transmitter antennas 526 in the form of vertical loops 902 with MI signal distributions substantially covering the access point (area) defined by the tunnel 900 and a cross-sectional width of the vertical loops 902 (i.e., an extent along the tunnel 900) so there is time for the DISABLE signal to be received by the wireless device from the loops 902, e.g., if a vehicle 904 is driving at a normal speed, e.g., above 20 kph, defining/providing the deactivation zone overlapping the access point (areas). Alternatively or additionally, the tunnel 900 can have mounted thereto a set of the RF disable antennas mounted such that their beam pattern(s) define/provide the deactivation zone overlapping the access point (area). The safety control system 110 can be in the tunnel 900, or located at a distance and communicatively connected by wires and/or wireless communication links. The tunnel 900 can have mounted thereto the access detector systems 528 in the form of non-contact detector units 906 on facing walls of the tunnel 900, each including non-contact detectors to detect the vehicle 904 or a person traversing the access point (area), e.g., optical beam and/or image detectors, defining/providing the detection zone overlapping the access point (areas). The tunnel 900 can have mounted thereto the one or more scanner antennas 530 in the non-contact detector units 906 on facing sides of the entrance/exit 802, thus defining/providing the scanner zone overlapping the access point (areas).

In an alternative implementation, the tunnel 900 can be a partially or completely vertical elevator tunnel or shaft, and the vehicle 904 can be an elevator or lift cage, thus the vertical loops 902 are mounted facing each other in the shaft, and the non-contact detector units 906 are mounted facing each other or at least on facing walls of the shaft.

In an implementation, the management modules 122 may be configured to control the processing unit 114 to control the RF/MI transmitter antenna in the tunnel 900 (or shaft) to send the DISABLE signals (wireless signals representing the DISABLE command) whenever the vehicle 903 (or lift cage) passes through the detection zone defined by the non-contact detector units 906 so that active/encoded wireless devices are disabled/deactivated whenever they are moved between portions of the work site separated by the tunnel 900 (e.g., between an active level and a safe level of the mine).

Encoder

Figure 12:
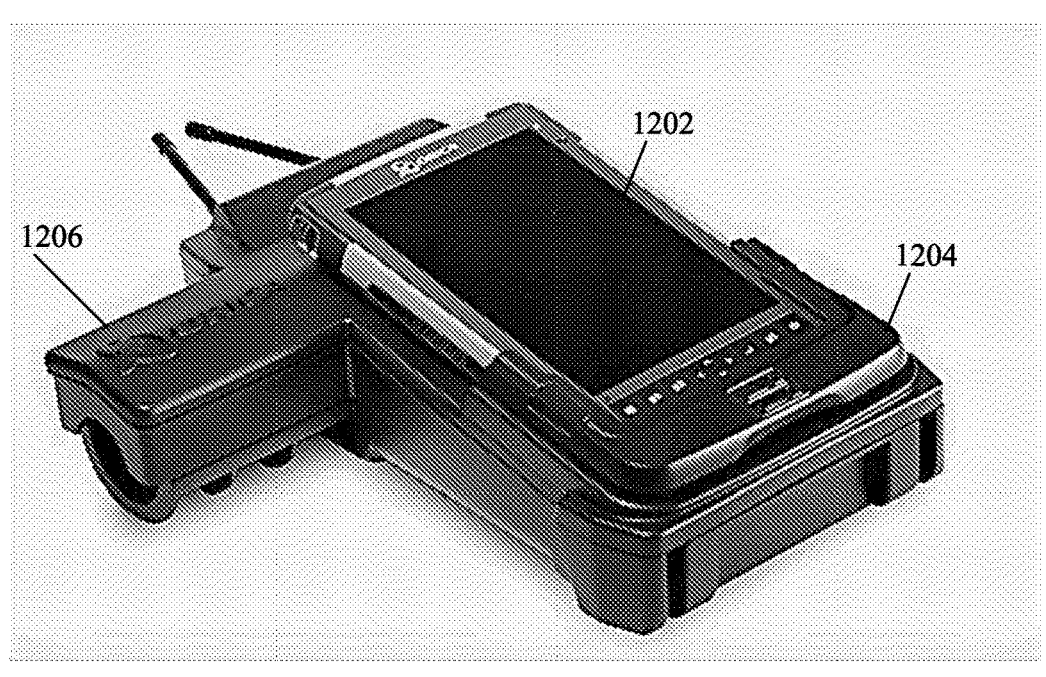
FIG. 12 is a render of an encoder for use with the WEB systems.

The safety system may include the encoder 204. As shown in FIG. 12, the encoder 204, which can be a hand-held, hand-portable device, may include a tablet computer 1202 with an internal power source, an NFC interface and one or more RF interfaces, including in some embodiments an RFID interface ("encoder RFID interface", e.g., an RFID module), a Bluetooth interface ("encoder Bluetooth interface", e.g., an Bluetooth module), and a WiFi interface ("encoder WiFi interface", e.g., a WiFi module). The tablet computer 1202, WiFi interface, NFC interface, Bluetooth and RFID interface may be arranged/configured as a single unitary device, together in a housing 1204, for handheld use. The encoder 204 may include a cradle/holder 1206 for holding/fastening/receiving the wireless device into the encoder 204 such that the wireless device is held by the cradle/holder 1206 during encoding/programming. The cradle/holder 1206 may be formed of plastic, e.g., formed with the housing 1204, and sized with an aperture to receive the wireless device longitudinally, and including a NFC coupling, optical coupling or electronic/electrode terminals in the aperture to communicatively couple the encoder 204 with the wireless device. The tablet computer may include a commercially available operating system, e.g., Windows™, with a touch screen human-machine interface (HMI).

The RFID interface of the encoder 204 may be configured to read passive RFID tags, including the tags 218 on the various wireless devices, including the communication modules 208, the detonators 212, and the boosters 214. As further detailed below, the RFID interface of the encoder 204 may also be configured for detecting, sensing, or receiving/processing active RFID signals generated by way of a beacon 1402 (e.g., which can be associated or linked with an intended, particular, or specific physical location associated with a given commercial blasting operation).

The safety system may include an encoder key (also referred to as a "encoder dongle", "access control key" or "authorisation key"), which is an additional security device which must be present with the encoder 204 for the encoder 204 to program/encode the wireless devices, e.g., to send commands including, for instance, an ID or GID or delay to the wireless devices. The encoder 204 may be configured to determine whether the encoder key is connected to the encoder 204 (e.g., by identifying/receiving encoder a required encoder enablement/authorisation code stored in the encoder key), including connected in close proximity, e.g., by an NFC or USB connection, before allowing encoder 204 to program/encode the wireless devices. Thus the encoder 204, when configured with this safety interlock/requirement, needs to be associated/connected with a specific key (because the encoder 204 is configure to require a specific encoder enablement/authorisation code) in order to operate.

The safety system may provide a Blast Inventory Management (BIM) method or process that includes:

a) the encoder 204 connecting to the encoder key to enable/activate the encoder 204, thus forming an "enabled encoder" (or "authorised encoder") in combination with the encoder key;

b) the enabled encoder 204 using its RFID scanner to scan the tagged wireless devices in inventory (e.g., storage or a magazine) and within "a BIM zone" defined by a range of the encoder's RFID scanner, at a blasting site, e.g., at the boreholes 506, which is the area where the blasting operations are planned to occur and/or are occurring (this process may be referred to as "initial inventory scan on blast bench")—the encoder 204 may include a user interface that prompts the operator/user to perform/arrange the initial inventory scan;

c) the enabled encoder 204 encoding/programming selected ones the wireless devices according the blasting plan, which transitions them to a new state as described hereinbefore (this process may be referred to as "authorised encoding");

d) the enabled encoder 204 recording the tag IDs (using its RFID scanner) corresponding to or of the encoded/programmed wireless devices, during the encoding/programming process (this process may be referred to as "automatic inventory removal/recording");

e) the enabled encoder 204 scanning any remaining ones of the wireless devices still in inventory, and within the BIM zone, and if any of the remaining wireless device have tag ID recorded as one of the programmed/tagged IDs, sending an encoder alarm signal to the safety control system 110 (thus the alarm activation module, to control the processing unit 114) to send an alarm command to the alarm systems 108, optionally with an urgency level of "encoded" (this process may be referred to as "post-loading inventor scan and inventory compilation")—if the post-loading inventory scan and inventory compilation process is not performed within a selected time/movement of the encoder 204, the encoder 204 may send an encoder notification or alarm signal to the safety control system 110 optionally with an urgency level lower than "encoded", e.g., "1", representing that the encoding process was not completed.

Blast Pattern Identifier/Beacon

The safety system may include a Blast Pattern Identifier (BPI) system that correlates, associates, or links each wireless device (e.g., each encoded wireless device) to the intended, particular, or specific location.

Figures 14A, 14B:
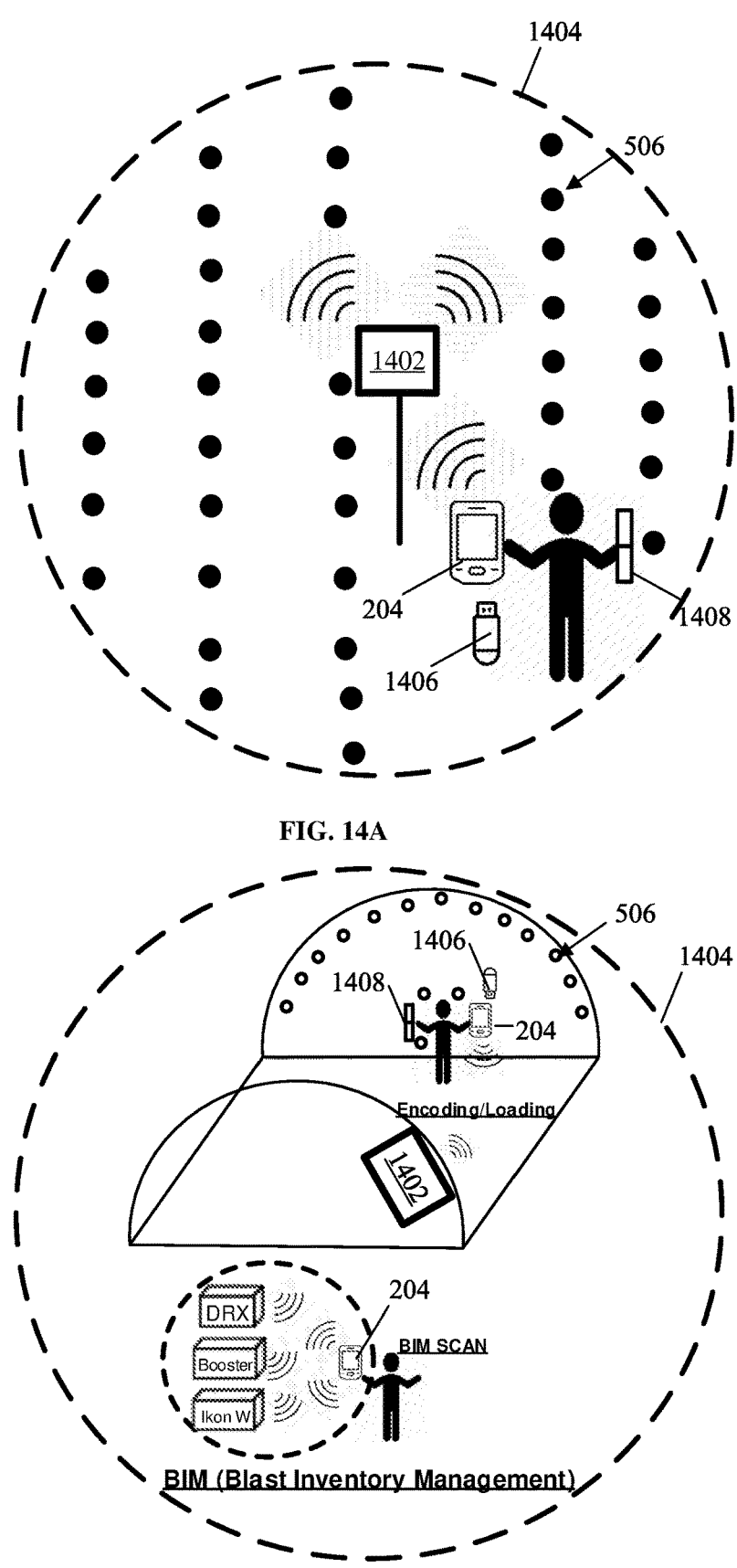
FIG. 14A is a diagram of an above-ground site with the encoder and a geofenced zone; and o)
FIG. 14B is a diagram of an underground site with the encoder and the geofenced zone.

As shown in FIG. 14A, the BPI system includes the beacon 1402 ("blast pattern beacon") which links a group of the encoded wireless devices to the intended, particular, or specific location (referred to as a "geofenced zone"), defined by a geofence/boundary 1404, in which the beacon 1402 is located/mounted/arranged, and which is defined by a wireless range of the beacon 1402. The beacon 1402 communicates with the encoder 204 using its RF interface (which includes a transmitter) and enables proper beacon-to-blast-pattern correlation.

The beacon 1402 includes an RF interface ("beacon RF interface"); an internal power source (e.g., a battery); and a protective container/housing configured to surround/seal/ enclose the RF interface and the internal power source from dust/moisture, and to protect the RF interface and the internal power source from impacts.

The beacon RF interface can include an active mode/ module and/or a passive mode/module. The beacon RF interface can include one or more active RF modules that draw power from the internal power source, and are therefore referred to as "active". The active RF interface may typically (though not necessarily) operate between 400 MHz and 500 MHz, e.g., including substantially 433 MHZ, which may be an appropriate frequency range for at least some mining applications. The beacon RF interface can include one or more passive RF modules that require external power from an external power or powering signal/source, e.g., the encoder 204 or the blast controller 510, to activate and communicate, and are therefore referred to as "passive". The beacon RF interface is configured to communicate with the encoder RF interfaces in both passive and active modes, e.g.: the beacon RF interface can include a passive RF interface and an active RF interface (which may be a switchable interface, i.e., switchable between passive and active modes, e.g., by a software switch, provided by one or more RFID/ Bluetooth/WiFi modules) that are both configured to communicate with the encoder RF interface, including having selected frequency ranges and protocols, e.g., RFID, Bluetooth, WiFi.

The beacon active RF modules can include the active RF interface and the passive RF interface in the form of a switchable active/passive RFID tag (which may be commercially available) that is configured to communicate with the encoder RFID interface. The switchable active/passive RFID tag ("switchable tag") may be configured to: operate in a passive mode of operation to identify the beacon 1402 upon an interrogation from an RFID reader by wirelessly sending the RFID reader an identification number of the beacon 1402 ("passive beacon ID"), the identification number including one or more bits set to a first value that indicates that the switchable tag is operating in the passive mode; and responsive to detecting an active-mode selection, the switchable tag is operable to engage the active mode of operation and initiate communication with the RFID reader and wirelessly transmit out a signal to the RFID reader, the signal pertaining to the beacon 1402 and comprising the identification number ("active beacon ID") of the switchable tag which includes the one or more bits set to a second value that indicate that the switchable tag is operating in the active mode.

The encoder 204, optionally including the encoder key 1406 as shown in FIGS. 14A and 14B and as described hereinbefore, may be configured to operate only when in the geofence/boundary 1404. The encoder 204 may be configured to determine whether the beacon 1402 is connected to or in range of the encoder 204, including connected within the wireless range of the beacon 1402, by the RF connection (e.g., by determining that that the beacon ID is readable), before allowing the encoder 204 to program/encode the wireless devices.

The safety system may provide a geofencing method or process that includes:

a) the encoder 204 (which can be the enabled encoder 204, i.e., coupled to the encoder key 1406) communicating with the beacon 1402 in its passive mode, using the passive RF interfaces to reduce power drain on the beacon 1402 (since range is not required at this step), to send/encode or read/identify a unique beacon identifier ("beacon ID") of the beacon 1402 such that the encoder 204 stores/saves the beacon ID (this process may be referred to as "encoder-beacon identification") so the encoder 204 automatically recognises the beacon 1402 as an authorised geofencing beacon in the following processes—for example, the encoder 204 may be configured to transmit to the beacon 1402 a Pattern ID (or "assigned Blast ID", e.g., from blasting software in the central blasting computing systems, e.g., a 32-byte string from ShotPlus™) to form the beacon ID;

b) the beacon 1402 being securely positioned/located/ mounted in the blasting site, e.g., using a rigid apparatus, e.g., a stand/pole/frame/post using straps/ties or to a wall/ceiling using bolts/ties/wirescreen, in the intended, particular, or specific location in the blasting site, e.g., at the boreholes 506 as shown in FIG. 14A. (this process may be referred to as "beacon placement on blast bench"), thus the beacon 1402 is ready to establish/provide/define the geofenced zone, wherein the intended, particular, or specific location is preselected in the blasting plans, e.g., based on which of the boreholes 506 are to be blasted next;

c) the beacon 1402 entering its active mode by activating the active RF interface, and thus establishing/providing/defining the geofenced zone by way of the geofence/boundary 1404, as shown in FIGS. 14A and 14B (this process may be referred to as "activating the beacon"), wherein activating the beacon 1402 may include the beacon 1402 and/or the encoder 204 (when it is communicatively coupled to the beacon 1402) receiving authentication data and/or user input to switch to the active mode, wherein the user input may include a username/password, or a fingerprint (via a reader of the encoder 204), or a voice or facial recognition (via a microphone or camera of the encoder 204), wherein the beacon 1402 may enter its active mode before and/or after the encoder 204 connects with the beacon 1402 in the geofence/boundary 1404, as shown in FIGS. 14A and 14B-use of the authentication data/ input can mitigate the risk of the beacon 1402 establishing the geofenced zone (where the wireless devices can be encoded, which is larger than the range of the beacon 1402 when in its passive mode) at an undesirable location (e.g., away from the boreholes 506) or at an undesirable time (e.g., before safety protocols have been followed);

d) the encoder 204 determining it is within the geofence/ boundary 1404 by communicating with the beacon 1402 (e.g., to detect its beacon ID (e.g., in its active RFID tag) which the encoder 204 has been configure to look for in the "encoder-beacon identification" process), e.g., using the active RF interfaces since the defined range is required at this step, and therefore being able to encode/program the wireless devices (this process may be referred to as "encoding inside geofenced zone")—allowing operation of the encoder 204 only within the geofenced zone can mitigate the risk of the wireless devices being encoded/programmed, and thus becoming active and potentially more dangerous, at an undesirable location (e.g., away from the boreholes 506) or at an undesirable time (e.g., before safety protocols have been followed);

e) the beacon 1402 entering its passive mode by de-activating the active RF interface, and thus closing/ ending the geofenced zone, wherein de-activating the beacon 1402 may include using a switch or soft-switch on the encoder 204 (when it is communicatively coupled to the beacon 1402) and/or on the beacon 1402 itself (this process may be referred to as "de-activating the beacon"); and f) the blast controller 510, which is generally located relatively distant, far, or remote from the bench/bore-holes 506, communicating with the de-activated beacon 1402, using the passive RF interfaces to reduce power drain on the beacon 1402 (since range is not required at this step), to read the beacon ID to confirm that the beacon 1402 is on longer on the bench and/or no longer providing any geofenced zone in which wireless devices can be encoded/programmed (this process may be referred to as "blaster-beacon blast location confirmation")—this process may mitigate the risk of the beacon 1402 being left undesirably in its active mode, and/or within communication range of the wireless devices and/or the encoder, after the encoding portion of the blasting operation is complete.

In the "blaster-beacon blast location confirmation" process, the blast controller 510 can also use the beacon ID (read from the beacon 1402) to match with one or more Pattern IDs that are planned for blasting according to the central blasting computing systems (by the blast controller 510 communicating with the central blasting computing systems) and/or to match with a Pattern ID stored on the encoder key 1406. In this process, if the one or more beacon IDs match the one or more Pattern IDs from the central blasting computing systems and/or the encoder key 1406, then the blast controller 510 is configured to be able to continue with the blasting sequence (e.g., to finalise the blast file, and to proceed to the arming sequence). However, if the blast controller 510 detects that read one or more beacon IDs do not match the one or more Pattern IDs, the blast controller 510 initiates abortion of the blasting procedure due to this mismatch: thus all read beacons IDs must be associated with a blast to be fired. After reading the beacon ID in the "blaster-beacon blast location confirmation" process, the blast controller 510 may be configured to erase the beacon ID from the beacon 1402, and deactivate/turn off the beacon 1402.

In the "encoding inside geofenced zone" process, the encoding may occur at various locations away from the beacon 1402 based on the average radius of the geofenced zone (e.g., 3 m, 10 m, 25 m 100 m 125 m, 150 m, 200 m, 250 m, etc.). While the encoder 204 is encoding the wireless devices, the beacon 1402 is in its active mode. The encoder 204 can proceed with the encoding (which could involve passive RFID reading of the tags IDs of the wireless devices, and/or NFC communication with the wireless devices to program them with GIDs and delay times) only when the encoder 204 is within the geofenced zone, e.g., the receiving range of the active RFID signal being output by the beacon 1402 that has been associated with the commercial blasting operation under consideration, where such association has occurred by way of the (generally passive mode) communication between the encoder 204 and the beacon 1402 in the "encoder-beacon identification" process.

In embodiments, when the beacon 1402 is in its active mode, the beacon 1402 can broadcast an active beacon ID that differs at least in part from the beacon ID ("passive beacon ID") that it detectable/scannable/readable when the beacon is in its passive mode. The encoder 204 may be configured to require reading of the active beacon ID before the encoder 204 can perform any encoding/programming of the wireless devices. If the beacon 1402 is configured to broadcast an active beacon ID that is predicably related to the passive beacon ID by a predicted difference (stored in the encoder 204), e.g., by including additional bits/data or a predefined transformation, the encoder 204 may be configured to recognise the passive beacon ID in the "encoder-beacon identification", and determine from the passive beacon ID and the stored predicted difference what active beacon ID is required to be detectable for the "encoding inside geofenced zone" process.

The encoder key 1406 and/or the encoder 204 coupled thereto may also be configured to record the tag IDs of the wireless devices as they are being encoded in the "encoding inside geofenced zone" process, and the blast controller 510 can receive these tag IDs from the encoder key 1406, the encoder 204 and/or the enabled encoder, e.g., in the "blaster-beacon blast location confirmation" process, to confirm that the wireless devices defined in the blast plan to be encoded/programmed in the intended, particular, or specific location were encoded correctly (e.g., with the correct timing).

The blast controller 510 and/or the encoder 204 may be configured to communicate with the central blasting computing systems, e.g., by each including a network communication unit and appropriate protocols, to transmit the tag IDs to the central blasting computing systems, including: data indicative of the tag IDs of the encoded/programmed wireless devices as they are encoded/programmed or in the "blaster-beacon blast location confirmation" process. In this way, the central blasting computing systems have up-to-date data indicative of which tag IDs have scanned and encoded in the site by the encoder 204, encoder key 1406 and/or blast controller 510, including: scanned in the BIM zone in the "initial inventory scan on blast bench" process; encoded in the "authorised encoding" process; and/or confirmed as encoded in the geofence zone in the "blaster-beacon blast location confirmation" process.

The geofence/boundary 1404 defines the geofenced zone based on the RF range of the beacon 1402. The wireless range, and thus an average radius of the geofenced zone, may be at least 100 m, 200 m, 300 m, or 350 m, e.g., selected in the configuration of the RF interface(s) of the beacon 1402. The multi-hundred meter range, e.g., 300-350 m, may be provided by the active RFID tag signal sensing range.

As shown in FIG. 14B, the blasting site may be underground, the boreholes 506 may be substantially horizontal, and the beacon 1402 may be mounted/secured/located/fixed to a tunnel.

As shown in FIG. 14B, the geofence/boundary 1404 (and thus geofenced zone) may include the blasting site, which can include the boreholes 506 and the inventory (e.g., storage or a magazine) area/location.

Blast Controller

Figure 13:
FIG. 13 is a render of a blast controller for use with the WEB systems.

The safety system may include the blast controller 510. As shown in FIG. 13, the blast controller 510 (also referred to as a "transmitter controller" or "blasting machine") can be a hand-held, hand-portable device, and may include a tablet computer 1302 and a rugged protective casing 1304, e.g., a shock-resistant polymer casing around corners, side edges and/or back of the tablet computer.

The blast controller 510 includes one or more RF interfaces, including an RFID interface ("blast controller RFID interface", e.g., an RFID module), a Bluetooth interface ("blast controller Bluetooth interface", e.g., an Bluetooth module), and a WiFi interface ("blast controller WiFi interface", e.g., a WiFi module).

The blast controller 510 communicates with, manages, or controls the transmitter (e.g., RF signal generator 512 and/or the MI signal generator 516), and selects groups of wireless devices (e.g., primers) to be fired (e.g., based on GID).

The safety system may include a blast controller key (also referred to as a "blast initiation key", "blast dongle", "access control key" or "authorisation key") as an additional security device which must be present with the blast controller 510 for the blast controller 510 to fire a blast, e.g., to send commands including, for instance, WAKE, ARM, and FIRE commands, to the wireless devices. The blast controller 510 may be configured to determine whether the blast controller key is in communication range of or connected to the blast controller 510, including connected in close proximity, e.g., by an NFC or USB connection, before allowing blast controller 510 to issue any commands to the wireless devices, e.g., WAKE, ARM or FIRE.

Keys

In embodiments, the encoder key and the blast controller key may be the same key/device ("combined key"), thus the encoder 204 can only program/encode with the combined key, and the blast controller 510 can only send blast commands with the combined key. The combined key can includes both the encoder key and the blast controller key in a a single unit/device.

Having the keys (the encoder key, the blast controller key, and/or the combined key) may allow for improved access control, activation authorisation and blasting safety by way of secure storage and physical access control of the keys.

The keys can each include: an active RFID tag or NFC tag or USB ID chip; optionally an internal power source (e.g., a battery, potentially not required for USB/NFC); computer readable/writable memory; and a protective container/housing configured to surround/seal/enclose the tag/chip and the internal power source from dust/moisture, and to protect the tag/chip and the internal power source from impacts.

Each key forms a manually separable communications device with a unique key ID, i.e., manually separable from the encoder 204 or blast controller 510, and including a unique ID that is encrypted and securely used by the encoder 204 or the blast controller 510 to detect that the key is authorised and thus automatically provides authority to act when correctly connected/communicating.

Wireless Device Details

In some implementations, the wireless device, e.g., the tagged device 202, includes a communication and control (CC) portion, module, or unit (e.g., including the control module 206, the communications module 208 and the internal power source 210) that is couplable (e.g., selectively couplable) or coupled to the initiation portion, module, or unit (e.g., including the booster explosive 214), for instance, an initiation unit that is configured for initiating, and optionally carries, an explosive composition (not shown). The wireless device may include an initiation element such as an electronic detonator that is couplable or coupled to the CC unit, and which is insertable or inserted into or carried within the initiation unit for initiating/detonating an explosive composition corresponding to the initiation unit. The wireless device's communication unit (e.g., 208) can include integrated circuitry configurable or configured for one-way or two-way wireless communication, e.g., involving radio frequency (RF), magnetic induction (MI), and/or other types of wireless communication signals, thus in various embodiments, the communication unit is configured for wireless communication with each of (a) an encoder (e.g., 204) by way of first wireless communication signals, such as first RF signals (e.g., NFC/RF signals) and/or optical signals; and (b) a set of the RF or MI antennas associated with the main blasting controller (and e.g., blast controller 510), such as by way of second wireless communication signals that can include MI signals (e.g., quasi-static MI signals) and/or second RF signals (e.g., where the second wireless communication signals can be through-the-earth (TTE) signals). The communication unit (e.g., 208) may thus include or be defined as having a first communication unit configured for a first type of wireless communication (e.g., NFC communication) by way of the first wireless communication signals; and a second communication unit configured for a second type of wireless communication (e.g., MI and/or RF communication, which can include TTE communication) by way of the second wireless communication signals. By way of the device communication unit (e.g., 208) and the initiation control unit (e.g., 206), the wireless device is configurable or configured for (a) receiving instructions/commands from and exchanging data with an external encoding/programming device or encoder (e.g., 204), e.g., which is configurable or configured for wireless communication by way of the first communication signals; and (b) processing and implementing or carrying out such instructions/commands. The instructions/commands and data received from the encoder can be directed to establishing or modifying the wireless device's operational status or state. The CC unit is further configured for receiving instructions/commands and possibly receiving data from or exchanging data with the set of antennas associated with the main blasting controller, including instructions/commands that enable or which lead to triggering explosive initiation of the initiation unit (e.g., the booster explosive 214), such that an explosive blast (e.g., the detonation of a column of explosive material(s) in a blasthole) occurs in accordance with a specific commercial blasting operation with which the wireless device is associated. Once the wireless device has been encoded by way of the encoding procedure, the wireless device can process and carry out commands including, for instance, WAKE, ARM, and FIRE commands, which can compromise safety if the wireless device is not in the correct time and place for blasting according to the blast plan. Each wireless device can include a unique identifier (ID) stored in memory in the initiation device. A group of the wireless devices can include a unique group ID (GID) stored in the memory. The FIRE commands are specific for each wireless device (by including the ID) or for each group of wireless devices/detonators (by including the GID). The wireless blasting devices may exclude conventional detonators and include other types of explosive initiators, e.g., sources of optical/heat energy or beams, without detonators. The FIRE command can include a delay component to specify a firing delay for each ID or each GID thereby determining a firing sequence for the wireless devices, or the firing/initiation delay of each wireless blasting device can be, and typically is, simply preprogrammed into the wireless blasting device during the encoding/programming, such that each wireless blasting device can perform its own count-down for firing/initiation relative to all wireless devices in a given group (e.g., defined by GID) that is intended to fire; this may enable a lot of flexibility with respect to blast design, e.g., by way of timing subsets of wireless blasting devices to fire/initiate relative to each other quite precisely.

The wireless device can be configured for deployment in a confined space proximate to or in the portion of the physical media. The wireless device has a geometry (including shape and size) configured for deployment in the confined space. The confined space can be a hole or borehole, and the geometry can include: a perpendicular width (e.g., diameter for a circular cross section) that is less that a borehole diameter (open diameter of the borehole); and a (longitudinal) length that can be limited by (i) loading manner and optionally (ii) other borehole contents. The device-based MI signal receiver is configured based on the size of the wireless device. The wireless device has the power source with an electrical charge storage capacity (i.e., power storage) associated with the size: for example, the wireless device can be sized to fit into conventional bore-holes, e.g., having an average diameter of substantially 4 to 6 cm (for a smaller embodiment) or substantially 10 to 20 cm (for a larger embodiment) or up to 90 cm (for very large holes), and the power storage can be substantially equivalent to two or four commercially available "AA" size batteries (each of which can have substantially 1000 to 4000 milli-ampere hours capacity, e.g., substantially 3500 mAh for a lithium AA battery).

In an embodiment, a wireless device includes a housing or shell that carries the power source (e.g., the battery and/or the set of capacitors); power management circuitry; at least one control/processing unit providing transistor based cir-cuitry configured for processing instructions/commands, and at least one memory for storing instructions/commands and data; possibly a sensing unit providing a set of sensors configured for sensing or generating signals corresponding to environmental conditions or parameters such as tempera-ture, pressure, vibration, shock, the presence of certain chemical species, light, and/or other conditions or param-eters (e.g., in-hole environmental conditions or parameters); an MI based communication unit providing modulation/ encoding circuitry coupled to a set of MI signal sources (e.g., one or more coil antennas), and demodulation/decod-ing circuitry coupled to a set of magnetometers (which can include one or more magnetometers, such as one or more types of magnetometers indicated above, corresponding to one or more orthogonal spatial axes); and an initiation device (e.g., a detonator, or a DDT device), which is configurable or configured for selectively initiating and/or detonating an associated, supplemental, or main explosive charge (e.g., a booster explosive charge) that can be asso-ciated with, couplable/coupled to, or contained in the hous-ing or shell.

The wireless device can include a housing, shell, case, frame and/or support structure that mechanically houses, carries, protects and/or supports at least pressure and water-sensitive elements of the wireless device.

WEB System Details

The WEB system described herein is configured for assisting commercial blasting by sending magnetic induc-tion (MI) signals to (and/or receiving MI signals from) the wireless devices that are deployable or deployed within portions of one or more physical media (e.g., a rock forma-tion) intended to be blasted as part of the commercial blasting operation. Such wireless devices include wireless initiation devices positioned in borcholes or blastholes, with which the MI Transmitter communicates as part of enabling/ disabling, encoding, querying, (re)programming, (re)syn-chronizing, and/or controlling the operation and/or firing of particular wireless initiation devices in association with the commercial blasting operation. The communication using the MI signal may be referred to as "through the earth" (TTE) communication or signalling, referring to the com-munication of signals in, through, and/or across a set of physical media residing between the signal source and the signal receiver or detector, e.g., wherein at least one of the signal source and the signal detector is at least partially obstructed, overlaid, covered, surrounded, buried, enclosed, or encased by the set of physical media. The set of physical media can include one or more of rock, broken rock, stone, rubble, debris, gravel, cement, concrete, stemming material, soil, dirt, sand, clay, mud, sediment, snow, ice, one or more hydrocarbon fuel reservoirs, site infrastructure, building/ construction materials, and/or other media or materials.

With respect to MI related communication terminology used herein, the terms "magnetic induction based commu-nication," "MI based communication," and "MI communi-cation" refer to the generation of a magnetic field, which in various embodiments includes a quasi-static magnetic field, in accordance with a modulation scheme or protocol to wirelessly communicate signals between a MI signal source that generates or outputs the modulated magnetic field and an MI signal receiver that receives or detects such signals, e.g., by way of detecting and decoding the modulated magnetic field. In multiple embodiments, the MI signal source includes an electrically conductive coil or loop antenna, and the MI signal receiver includes a magnetom-eter. MI based communication can involve, include, or be (a) near-field signal communication, in which the MI signal receiver is located within a near-field region or zone of the magnetic field generated by the MI signal source, wherein magnetic field strength as a function of distance away from the MI signal source decays in accordance with an inverse distance cubed relationship, and the MI signal source detects changes in near-field magnetic flux generated by the MI signal source rather than detecting far-field or radiatively propagated electromagnetic waves (e.g., radio waves) gen-erated by the MI signal source; and/or (b) transition region or zone signal communication, in which the MI signal receiver resides beyond the near-field region or zone of the magnetic field generated by the MI signal source, but resides within approximately one-half of a wavelength away from the MI signal source, and more commonly or particularly resides within approximately 10 skin depths (e.g., less than 10 skin depths), approximately 6-8 skin depths (e.g., less than 8 skin depths), approximately 3-5 skin depths (e.g., less than 5 skin depths), or approximately 2-4 skin depths (e.g., less than 4 skin depths) away from the MI signal source, wherein the near-field inverse distance cubed magnetic field strength decay relationship is modified (e.g., as a result of interaction(s) between near-field and far-field magnetic flux, and/or secondary fields that are induced by way of the physical media in or through which signal communication occurs). Individuals having ordinary skill in the relevant art, e.g., in relation to TTE communication, will understand the meaning or definition of skin depth. It can be noted that skin depth is the same physical property that individuals having ordinary skill in electrical engineering understand with respect to current crowding, e.g., in wires, for alternating current (AC) signals. Individuals having ordinary skill in the relevant art will further understand that in conductive media, an MI signal wavelength will be approximately $2*\eta*\delta$, where $\delta$ is the skin depth, and hence one-half wavelength is approximately 3.1 skin depths. Typical earth media or mate-rials, e.g., media or materials in/below the ground, can be categorized as conductive in this sense. In view of the foregoing, the transition zone thus exists between the near-field and the far-field zones of the magnetic field generated by the MI signal source; hence, individuals having ordinary skill in the art will recognize that in transition zone com-munication, even though the MI signal receiver resides beyond or outside of the near-field region of the magnetic field generated by the MI signal source, the MI signal receiver does not reside in the far-field region or zone of the magnetic field generated by the MI signal source. Further in view of the foregoing, with respect to the generation of signals by an MI signal source and the detection of such signals by an MI signal receiver, MI based communication in accordance with various embodiments of the present disclosure can involve, include, or be (i) near-field signal communication, and/or (ii) transition zone signal communication, depending upon embodiment details, a commercial blasting operation under consideration, and/or a commercial blasting environment under consideration. Thus the MI communication in accordance with various embodiments of the present disclosure occurs or predominantly occurs by way of the generation and detection of variations in a magnetic field, e.g., in a near-field zone or a transition zone as set forth above. The terms "magnetic induction communication signal," "MI communication signal," and "MI signal" refer to a signal encoded upon a magnetic field, e.g., a quasi-static magnetic field generated by a magnetic signal source, by way of a modulation scheme or protocol. Accordingly, the MI signals may be near-field signals and/or transition zone signals that provide downlink MI communication including downlink MI signals to the wireless devices. For the near-field signal MI communication, the device-based MI Receiver is located within a near-field region or zone of a magnetic field generated by the MI Transmitter. Magnetic field strength as a function of distance away from the MI Transmitter decays in accordance with an inverse distance cubed relationship, and the device-based MI Receiver may detect changes in near-field magnetic flux generated by the MI Transmitter rather than detecting far-field or radiatively propagated electromagnetic waves (e.g., radio waves) generated by the vehicle-based or broadcast MI signal source. The transition-zone signals can provide uplink MI communication including uplink MI signals from the wireless devices to the external MI signal receiver. For the transition region or zone signal MI communication, the external MI signal receiver can be positioned beyond the near-field region or zone of the magnetic field generated by the device-based MI signal source, but within approximately one-half of a wavelength away from the device-based MI signal source, and more commonly or particularly resides within approximately 10 skin depths (e.g., less than 10 skin depths), approximately 6 to 8 skin depths (e.g., less than 8 skin depths), approximately 3 to 5 skin depths (e.g., less than 5 skin depths), or approximately 2 to 4 skin depths (e.g., less than 4 skin depths) away from the device-based MI signal source.

The wireless devices are configured to receive, decode and process the downlink MI signals. The MI Receiver can include a set of electrically conductive coil or loop antennas, with an average diameter of between 0.01 m and 0.3 m, which can corresponding to a diameter of the borehole. The MI Receiver can include device-based magnetometers, which can be 3-axis magnetometers configured for detecting magnetic flux in 3 mutually orthogonal axes, or single axis (1-axis) magnetometers configured for detecting magnetic flux in 1 orthogonal axis. The single axis (1-axis) magnetometer can be aligned in the wireless device for detecting magnetic flux parallel to the lengthwise, longitudinal, or central axis of the wireless device. Alternatively, the single axis (1-axis) magnetometer can be aligned in the wireless device for detecting magnetic flux perpendicular to the lengthwise, longitudinal, or central axis of the wireless device. The downlink MI signals can travel a downlink distance TTE using one or more downlink MI signal frequencies, which can include broadcast MI signal frequencies. The broadcast MI signal frequencies can include substantially 2 kHz, or between 100 Hz and 10 kHz, or between 100 Hz and 100 kHz. The broadcast downlink distance can be greater than 100 meters; greater than multiple or many hundreds of meters; between 200 and 900 meters; greater than a kilometre; or greater than multiple kilometres. The broadcast downlink MI signal frequencies can include at least one frequency within the ultra-low frequency (ULF) band, or within the very low frequency (VLF) band as defined by the International Telecommunications Union (ITU).

The MI Transmitter may include a current driver providing MI signal modulation circuitry, and the broadcast loop antenna that can be driven by the current driver, configured for generating or outputting broadcast MI communication signals having sufficient strength to be received by the wireless devices, e.g., the wireless initiation devices that will be initiated during the blast or blast sequence. The broadcast loop antenna can have an average loop diameter between 1 m and 100 m, or between 1 km and 10 km. The broadcast distance can be greater than 100 meters; greater than multiple or many hundreds of meters; between 200 and 900 meters; greater than a kilometre; or greater than multiple kilometres. The broadcast loop antenna may include a set of WebGen™ 100 Quad Loops. The MI Transmitter can output, issue, or broadcast a synchronization signal that can be received and processed by each of the wireless initiation devices that will be involved in the blast or blast sequence, optionally including device IDs and/or GIDs.

EMBODIMENTS

Disclosed herein are a plurality of embodiments, including:

Embodiment 1. A system for commercial blasting operations, the system including: one or more wireless transmitter systems configured to send command signals wirelessly to wireless devices that are configured for wireless electronic blasting (WEB), the wireless transmitter systems including one or more disable antennas that define one or more deactivation zones;

one or more vehicle/personnel presence detector systems including detectors that define one or more detection zones, and/or one or more RFID scanner systems with reader antennas that defined one or more scanner zones; and a safety control system in electronic communication with the one or more wireless transmitter systems, and the vehicle/personnel presence detector systems and/or the RFID scanner systems, wherein the safety control system is configured to control the wireless transmitter systems to send at least one wireless DISABLE command to disable the wireless devices that are within the deactivation zones in response to a vehicle/person being detected in the detection zones and/or a wireless device being detected in the scanner zones.

Embodiment 2. The system of Embodiment 1, wherein the disable antennas include: one or more RF antennas and/or one or more MI antennas.

Embodiment 3. The system of Embodiment 1 or 2, wherein the DISABLE command acts as a state transition signal or command by which a set of the wireless initiation device can be or is transitioned to a safe/standby mode or a reset/disabled state, including after the set of the wireless initiation device has been programmed/encoded.

Embodiment 4. The system of any one of Embodiments 1 to 3, including one or more alarm systems, wherein the safety control system is in electronic communication with the one or more alarm systems, wherein the safety control system is configured to control the alarm systems to generate alarms when the safety control system detects the wireless devices within scanner zones that are defined by locations/orientations of reader antennas of the RFID scanner systems.

Embodiment 4A. The system of Embodiment 4, wherein the alarm systems are configured to sound, display and or send alarms, including at a plurality of urgency levels, when they receive an alarm command with an urgency level from the safety control system.

Embodiment 5. The system of any one of Embodiments 1 to 4A, wherein the DISABLE command includes a wireless device ID and/or a wireless device GID in order to selectively disable only wireless devices in the deactivation zone with a matching ID or GID.

Embodiment 6. The system of any one of Embodiments 1 to 5, wherein the wireless devices include respective RFID tags mounted/attached thereto, optionally passive RFID tags.

Embodiment 7. The system of Embodiment 6, wherein the RFID scanner systems provide continuous background reading of the RFID tags Embodiment 8. The system of any one of Embodiments 1 to 7, the RFID scanner systems including a plurality of RFID scanner systems with substantially overlapping scanner zones.

Embodiment 9. The system of any one of Embodiments 1 to 8, wherein the safety control system is in electronic communication with a central blasting computing systems, and is configured to request a status of associated of the wireless device, from the central blasting computing systems, based on an ID scanned by the RFID scanner systems.

Embodiment 10. The system of any one of Embodiments 1 to 9, including a WEB system with a blast controller and one or more signal generators connected to the blast controller to receive signals representing wireless electronic blasting commands, optionally including an RF signal generator configured to drive an RF antenna mounted and configured to direct the RF signals to the wireless devices in boreholes, and optionally including an MI signal generator configured to drive an MI antenna mounted and configured to direct the MI signals to the wireless devices in the boreholes, optionally wherein the safety control system connects/couples communicatively to the RF signal generator and/or the MI signal generator to transmit the DISABLE command to the wireless devices in the boreholes.

Embodiment 11. The system of any one of Embodiments 1 to 10, including one or more access structures that provide access for the vehicles/people through boundary structures and into/from site storage structures, wherein the access structures define respective access points for the vehicles/people, wherein:

the RF/MI antennas are configured and mounted such that the deactivation zones overlap with the access points, the access detector systems are mounted/positioned surrounding and/or adjacent the access structures such that the detection zones overlap the access points, and/or the one or more scanner antennas are mounted adjacent to and/or surrounding one or more of the access structures to cover and/or cross the access point of the corresponding access structure such that the scanner zones overlap the access points.

Embodiment 12. The Embodiment of any one of claims 1 to 11, wherein the one or more vehicle/personnel presence detector systems are configured to detect/determine respective travel directions of a vehicle/person through the one or more of the detection zones, wherein the at least one wireless DISABLE command is selectively generated based on the determined travel direction of each detection zone.

Embodiment 13. A process or method for commercial blasting operations, the process or method including:

detecting a vehicle/personnel in a detection zone, and/or scanning an RFID tag of a wireless device that is configured for wireless electronic blasting (WEB) in a scanner zone;

controlling one or more wireless transmitter systems to send a wireless DISABLE command to disable wireless devices within one or more deactivation zones in response to the vehicle/person being detected in the detection zone and/or the wireless device being detected in the scanner zone.

Embodiment 14. A system for commercial blasting operations, the system including:

a) an alarm/disable system including:

i) one or more wireless transmitter systems configured to send command signals wirelessly to wireless devices that are configured for wireless electronic blasting (WEB), the wireless transmitter systems including one or more disable antennas that define one or more deactivation zones, and/or ii) one or more alarm systems configured to sound, display and/or send alarms, optionally including at a plurality of urgency levels, when they receive an alarm command optionally with an urgency level;

b) a scanner/detector system including:

i) one or more vehicle/personnel presence detector systems including detectors that define one or more detection zones, and/or ii) one or more RFID scanner systems with reader antennas that defined one or more scanner zones; and c) a safety control system in electronic communication with the one or more wireless transmitter systems and/or the one or more alarm systems, and with the vehicle/personnel presence detector systems and/or the RFID scanner systems, wherein the safety control system is configured to:

control the wireless transmitter systems to send at least one wireless DISABLE command to disable the wireless devices that are within the deactivation zones when the safety control system detects that a vehicle/person is detected in the detection zones and/or a wireless device is scanned in the scanner zones, optionally based on the urgency level; and/or control the alarm systems to sound, display and/or send the alarms when the safety control system detects that a vehicle/person is detected in the detection zones and/or a wireless device is scanned in the scanner zones, optionally based on the urgency level.

Embodiment 15. A process or method for commercial blasting operations, the method including:

a) detecting a vehicle/personnel in a detection zone, and/or scanning an RFID tag of a wireless device that is configured for wireless electronic blasting (WEB) in a scanner zone; and b) in response to the vehicle/person being detected in the detection zone and/or the wireless device being detected in the scanner zone, automatically controlling:

i) one or more wireless transmitter systems to send a wireless DISABLE command to disable wireless devices within one or more deactivation zones, optionally including at a plurality of urgency levels; and/or ii) one or more alarm systems to sound, display and/or send alarms, optionally including at a plurality of urgency levels.

Embodiment 16. A system for commercial blasting operations, the system including:

a) an encoder configured to encode/program one or more wireless devices that are configured for wireless electronic blasting (WEB); and b) an encoder key, which must be present with the encoder for the encoder to program/encode the wireless devices, and/or a beacon defining a geofenced zone, which the encoder must be within for the encoder to program/encode the wireless devices.

Embodiment 17. A system for commercial blasting operations, the system including:

a) a blast controller configured to send, relay, and/or verify blasting commands directed to one or more wireless devices that are configured for wireless electronic blasting (WEB); and b) a blast controller key, which must be present with the blast controller for the blast controller to send, relay, and/or verify the blasting commands directed to the wireless devices.

Embodiment 18. A process or method for commercial blasting operations, the method including:

a) an encoder automatically determining whether a beacon and/or an encoder key is connected to or in range of the encoder; and b) if so, the encoder programming/encoding one or more wireless devices that are configured for wireless electronic blasting (WEB).

Embodiment 18. A process or method for commercial blasting operations, the process or method including:

a) a blast controller automatically determining whether a blast controller key is connected to or in range of the blast controller; and b) if so, the encoder programming/encoding one or more wireless devices that are configured for wireless electronic blasting (WEB).

Interpretation

The term "initiation" refers to the initiation or triggering of combustion, a deflagration, a deflagration to detonation transition (DDT), or detonation in a material or substance carrying an explosive composition, and the associated formation of different chemical species, or the initiation of chemical reactions that result in combustion and the associated formation of different chemical species in the material or substance. The term "explosive initiation" refers to initiation giving rise to an explosion or detonation, the occurrence of which corresponds to or is defined by at least some of a rapid energy release, volume increase, temperature increase, and gas production or release, as well as the generation of at least a subsonic shock wave. The term "detonation" refers to the generation of a supersonic detonation wave or shock front in an explosive material or substance, in a manner understood by individuals having ordinary skill in the relevant art.

The term "commercial blasting operation" includes the initiation and/or detonation of explosive materials or substances disposed in the physical media, e.g., a geological formation, by way of initiation devices as part of mining, quarrying, civil construction/demolition, seismic exploration, and/or another non-military blasting operation. Such initiation and/or detonation explosively blasts, e.g., fractures and/or heaves, or the physical media in which the commercial blasting operation occurs. Such initiation and/or detonation can be referred to as blasting, in a manner readily understood by individuals having ordinary skill in the relevant art. The physical media in which the commercial blasting operation occurs is located in a commercial blasting environment, such as a mining environment, e.g., an open cut or underground mine.

Herein, reference to one or more embodiments, e.g., as various embodiments, many embodiments, several embodiments, multiple embodiments, some embodiments, certain embodiments, particular embodiments, specific embodiments, or a number of embodiments, need not or does not mean or imply all embodiments.

As used herein, the term "set" corresponds to or is defined as a non-empty finite organization of elements that mathematically exhibits a cardinality of at least 1 (i.e., a set as defined herein can correspond to a unit, singlet, or single element set, or a multiple element set), in accordance with known mathematical definitions (for instance, in a manner corresponding to that described in An Introduction to Mathematical Reasoning: Numbers, Sets, and Functions, "Chapter 11: Properties of Finite Sets" (e.g., as indicated on p. 140), by Peter J. Eccles, Cambridge University Press (1998)). Thus, a set includes at least one element. In general, an element of a set can include or be one or more portions of a system, an apparatus, a device, a structure, an object, a process, a procedure, physical parameter, or a value depending upon the type of set under consideration.

The FIGS. included herewith show aspects of non-limiting representative embodiments in accordance with the present disclosure, and particular structural elements shown in the FIGS. may not be shown to scale or precisely to scale relative to each other. The depiction of a given element or consideration or use of a particular element number in a particular FIG. or a reference thereto in corresponding descriptive material can encompass the same, an equivalent, an analogous, categorically analogous, or similar element or element number identified in another FIG. or descriptive material associated therewith. The presence of "/" in a FIG. or text herein is understood to mean "and/or" unless otherwise indicated, i.e., "A/B" is understood to mean "A" or "B" or "A and B". The recitation of a particular numerical value or value range herein is understood to include or be a recitation of an approximate numerical value or value range, for instance, within +/−20%, +/−15%, +/−10%, +/−5%, +/−2.5%, +/−2%, +/−1%, +/−0.5%, or +/−0%. The term "essentially all" or "substantially" can indicate a percentage greater than or equal to 50%, 60%, 70%, 80%, or 90%, for instance, 92.5%, 95%, 97.5%, 99%, or 100%.

Many modifications will be apparent to those skilled in the art without departing from the scope of the present invention.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

The invention claimed is:

1. A system for commercial blasting operations, the system including:

one or more wireless transmitter systems configured to send command signals wirelessly to wireless devices that are configured for wireless electronic blasting (WEB), the wireless transmitter systems including one or more disable antennas that define one or more deactivation zones;

one or more vehicle/personnel presence detector systems including detectors that define one or more detection zones, and/or one or more RFID scanner systems with reader antennas that defined one or more scanner zones; and a safety control system in electronic communication with the one or more wireless transmitter systems, and the vehicle/personnel presence detector systems and/or the RFID scanner systems, wherein the safety control system is configured to control the wireless transmitter systems to send at least one wireless DISABLE command to disable the wireless devices that are within the deactivation zones, and/or to control one or more alarm systems to generate alarms, in response to a vehicle/person being detected in the detection zones and/or a wireless device being detected in the scanner zones, and wherein the one or more vehicle/personnel presence detector systems are configured to detect/determine respective travel directions of a vehicle/person through the one or more of the detection zones, wherein the at least one wireless DISABLE command is selectively generated based on the determined travel direction of each detection zone, or wherein the system includes:

an alarm/disable system including:

one or more wireless transmitter systems configured to send command signals wirelessly to wireless devices that are configured for wireless electronic blasting (WEB), the wireless transmitter systems including one or more disable antennas that define one or more deactivation zones, and/or one or more alarm systems configured to sound, display and/or send alarms, when they receive an alarm command;

a scanner/detector system including:

one or more vehicle/personnel presence detector systems including detectors that define one or more detection zones, and/or one or more RFID scanner systems with reader antennas that defined one or more scanner zones; and a safety control system in electronic communication with the one or more wireless transmitter systems and/or the one or more alarm systems, and with the vehicle/personnel presence detector systems and/or the RFID scanner systems, wherein the safety control system is configured to:

control the wireless transmitter systems to send at least one wireless DISABLE command to disable the wireless devices that are within the deactivation zones when the safety control system detects that a vehicle/person is detected in the detection zones and/or a wireless device is scanned in the scanner zones; and/or control the alarm systems to sound, display and/or send the alarms when the safety control system detects that a vehicle/person is detected in the detection zones and/or a wireless device is scanned in the scanner zones.

2. The system of claim 1, wherein the disable antennas include: one or more RF antennas.

3. The system of claim 1, wherein the DISABLE command acts as a state transition signal or command by which a set of wireless initiation devices can be or is transitioned to a safe/standby mode or a reset/disabled state, including after the set of the wireless initiation devices have been programmed/encoded.

4. The system of claim 1, including the one or more alarm systems, wherein the safety control system is in electronic communication with the one or more alarm systems, wherein the safety control system is configured to control the alarm systems to generate the alarms when the safety control system detects the wireless devices within scanner zones that are defined by locations/orientations of reader antennas of the RFID scanner systems, wherein the alarm systems are configured to sound, display and or send alarms, including at a plurality of urgency levels, when they receive an alarm command with an urgency level from the safety control system.

5. The system of claim 1, wherein the DISABLE command includes a wireless device ID and/or a wireless device Group ID (GID) in order to selectively disable only wireless devices in the deactivation zone with a matching ID or GID.

6. The system of claim 1, wherein the wireless devices include respective RFID tags mounted/attached thereto, including passive RFID tags.

7. The system of claim 6, wherein the RFID scanner systems provide continuous background reading of the RFID tags.

8. The system of claim 1, the RFID scanner systems including a plurality of RFID scanner systems with substantially overlapping scanner zones.

9. The system of claim 1, wherein the safety control system is in electronic communication with a central blasting computing systems, and is configured to request a status of associated of the wireless device, from the central blasting computing systems, based on an ID scanned by the RFID scanner systems.

10. The system of claim 1, including a WEB system with a blast controller and one or more signal generators connected to the blast controller to receive signals representing wireless electronic blasting commands.

11. The system of claim 10, wherein the WEB system includes an MI signal generator configured to drive an MI antenna mounted and configured to direct the MI signals to the wireless devices in at least one borehole.

12. The system of claim 11, wherein the safety control system connects/couples communicatively to the MI signal generator to transmit the DISABLE command to the wireless devices in the at least one borehole.

13. The system of claim 1, including one or more access structures that provide access for the vehicle/person through boundary structures and into/from site storage structures, wherein the access structures define respective access points for the vehicle/person.

14. The system of claim 13, wherein the disable antennas are RF/MI antennas configured and mounted such that the deactivation zones overlap with the access points.

15. The system of claim 13, wherein access detector systems are mounted/positioned surrounding and/or adjacent the access structures such that the detection zones overlap the access points.

16. The system of claim 13, wherein the one or more scanner antennas are mounted adjacent to and/or surrounding one or more of the access structures to cover and/or cross the access point of a corresponding access structure such that the scanner zones overlap the access points.

17. The system of claim 1, wherein the one or more alarm systems are configured to sound, display and/or send the alarms at a plurality of urgency levels, and/or wherein the alarm command includes an urgency level, and wherein the safety control system is configured to control the wireless transmitter systems to send the at least one wireless DIS-ABLE command based on the urgency level and/or to control the alarm systems to sound, display and/or send the alarms based on the urgency level.

18. A process or method for commercial blasting operations, the process or method including:

detecting a vehicle/personnel in a detection zone, and/or scanning an RFID tag of a wireless device that is configured for wireless electronic blasting (WEB) in a scanner zone;

controlling one or more wireless transmitter systems to send a wireless DISABLE command to disable wireless devices within one or more deactivation zones, the one or more wireless transmitter systems including one or more disable antennas that define the one or more deactivation zones; and/or controlling one or more alarm systems to generate alarms, in response to the vehicle/personnel being detected in the detection zone and/or the wireless device being detected in the scanner zone, wherein the wireless DISABLE command is selectively generated based on a determined travel direction of the vehicle/personnel through the detection zone.

19. The process or method of claim 18, including transmitting the wireless DISABLE command by way of one or more RF antennas defining one of the deactivation zones using RF frequencies that travel substantially through the air (TTA) but not substantially through the earth (TTE) when an array of at least one borehole has been loaded with the at least one of the wireless devices which are configured to respond to ARM and FIRE commands by way of TTE signals.

20. The method of claim 18, including:

controlling the one or more wireless transmitter systems to send the wireless DISABLE command at a plurality of urgency levels, and/or controlling the one or more alarm systems to generate the alarms at a plurality of urgency levels.

\* \* \* \* \*